United States Patent
Gao

(10) Patent No.: US 10,244,295 B2
(45) Date of Patent: Mar. 26, 2019

(54) PASSIVE OPTICAL NETWORK COMMUNICATIONS METHOD, APPARATUS AND SYSTEM

(71) Applicant: Huawei Technologies Co., Ltd., Shenzhen (CN)

(72) Inventor: Bo Gao, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/406,392

(22) Filed: Jan. 13, 2017

(65) Prior Publication Data

US 2017/0171647 A1    Jun. 15, 2017

Related U.S. Application Data

(63) Continuation of application No. PCT/CN2014/082279, filed on Jul. 15, 2014.

(51) Int. Cl.
*H04Q 11/00* (2006.01)
*H04B 10/25* (2013.01)
(Continued)

(52) U.S. Cl.
CPC ....... *H04Q 11/0005* (2013.01); *H04B 10/038* (2013.01); *H04B 10/25* (2013.01);
(Continued)

(58) Field of Classification Search
CPC ................. H04B 10/038; H04J 14/0227
See application file for complete search history.

(56) References Cited

U.S. PATENT DOCUMENTS

| 2006/0062576 A1* | 3/2006 | Nakamura | H04J 14/0226 398/72 |
| 2006/0210266 A1* | 9/2006 | Aoki | H04Q 11/0005 398/19 |

(Continued)

FOREIGN PATENT DOCUMENTS

| AL | WO 2013173983 A1 | 11/2013 |
| CN | 1925370 A | 3/2007 |

(Continued)

OTHER PUBLICATIONS

"IEEE Standard for Ethernet," IEEE Std 802.3-2012, Section Five, pp. 1-884, Institute of Electrical and Electronics Engineers, New York, New York (2012).

(Continued)

*Primary Examiner* — Dzung D Tran
(74) *Attorney, Agent, or Firm* — Leydig, Voit & Mayer, Ltd.

(57) ABSTRACT

The present invention discloses a passive optical network communications method, apparatus and system. The method includes: receiving, by an optical network unit, a first message sent by an optical line terminal, where the first message carries backup wavelength channel ID information; switching, by the optical network unit when the optical network unit detects a fault, an operating wavelength channel of the optical network unit to a backup wavelength channel identified by the backup wavelength channel ID information; and performing, by the optical network unit, data communication over the switched-to backup wavelength channel. In this way, fast protection switching of a passive optical network system is implemented and reliability of the system is improved.

35 Claims, 8 Drawing Sheets

(51) Int. Cl.
*H04J 14/02* (2006.01)
*H04B 10/038* (2013.01)
(52) U.S. Cl.
CPC .......... *H04J 14/02* (2013.01); *H04J 14/0227* (2013.01); *H04Q 2011/0016* (2013.01); *H04Q 2011/0043* (2013.01)

(56) References Cited

U.S. PATENT DOCUMENTS

| | | |
|---|---|---|
| 2007/0092256 A1 | 4/2007 | Nozue et al. |
| 2008/0166127 A1* | 7/2008 | Kazawa .............. H04J 14/0282 398/79 |
| 2012/0114333 A1* | 5/2012 | Zhang ................ H04Q 11/0067 398/58 |
| 2013/0315589 A1* | 11/2013 | Gao .................. H04Q 11/0005 398/48 |
| 2014/0133863 A1* | 5/2014 | Mizutani ............. H04J 14/0257 398/79 |

FOREIGN PATENT DOCUMENTS

| | | |
|---|---|---|
| CN | 101667865 A | 3/2010 |
| CN | 101873514 A | 10/2010 |
| CN | 101990132 A | 3/2011 |
| WO | WO 2012136155 A1 | 10/2012 |

OTHER PUBLICATIONS

"Phoneline networking transceivers—Isolation function," ITU-T Recommendation G.989.3, pp. 0-14, International Telecommunication Union, Geneva, Switzerland (Mar. 2003).

* cited by examiner

PASSIVE OPTICAL NETWORK COMMUNICATIONS METHOD, APPARATUS AND SYSTEM

CROSS-REFERENCE TO RELATED APPLICATIONS

This application is a continuation of International Patent Application No. PCT/CN2014/082279, filed on Jul. 15, 2014, which is hereby incorporated by reference in its entirety.

TECHNICAL FIELD

The present invention relates to the field of optical communications technologies, and in particular, to a passive optical network communications method, apparatus and system.

BACKGROUND

A passive optical network (PON) technology is a point-to-multipoint fiber access technology. With continuous development of technologies, an Ethernet Passive Optical Network (EPON), a Gigabit passive Optical Network (GPON), an next generation PON (NG PON), and the like emerge. To ensure network reliability, a PON network needs to support fast switching. FIG. 1 shows a PON network architecture, which includes a first Optical Line Terminal 10 (OLT), a second OLT 12, an Optical Distribution Network (ODN), and Optical Network Unit (ONUs). When the first OLT 10 serves as an active OLT, a feeder fiber between an active port on the first OLT 10 and the ODN is an active feeder fiber, and a feeder fiber between a standby port on the second OLT 12 and the ODN is a standby feeder fiber. In a case in which the active feeder fiber or the active port is faulty, switching to the standby port needs to be performed to recover a service and implement protection for the feeder fiber.

In order to further extend application of the PON, a time wavelength division multiplexing-passive optical network (TWDM-PON) is put forward in the industry. The TWDM-PON is a passive optical network that combines both WDM and TDM technologies, and includes an office-side optical line terminal (OLT), a user-side optical network unit (ONU) or optical network terminal (ONT), and an optical distribution network (ODN).

When a feeder fiber between the OLT and the ODN or a working port of the optical line terminal is faulty and this leads to interruption of communication between the optical line terminal and the optical network unit, no specific solution has yet been given for the TWDM-PON system, which is also an urgent issue that currently needs to be solved in the TWDM-PON system.

SUMMARY

Embodiments of the present invention provide a PON communications method, a related device and a PON to solve a problem of communication interruption caused by a fault occurring in a passive optical network system, which implements fast protection switching of the passive optical network system and improves reliability of the system.

According to the first aspect, a passive optical network communications method is provided, which may include: receiving, by an optical network unit, a first message sent by an optical line terminal, where the first message carries backup wavelength channel ID information; switching, by the optical network unit when the optical network unit detects a fault, an operating wavelength channel of the optical network unit to a backup wavelength channel identified by the backup wavelength channel ID information; and performing, by the optical network unit, data communication over the switched-to backup wavelength channel.

With reference to the first aspect, in a first possible implementation manner of the first aspect, the first message includes a message type ID Message type ID field and a message content field, where the message type ID field of the first message is a channel profile field, a system profile field or a protect-pair-configure field, and the message content field includes the backup wavelength channel ID information.

With reference to the first aspect, in a second possible implementation manner of the first aspect, the backup wavelength channel ID information includes a downstream backup wavelength channel ID; and the switching, by the optical network unit, an operating wavelength channel of the optical network unit to a backup wavelength channel identified by the backup wavelength channel ID information includes:

switching, by the optical network unit, a downstream operating wavelength channel in operating wavelength channels of the optical network unit to a downstream backup wavelength channel identified by the downstream backup wavelength channel ID.

With reference to the first possible implementation manner of the first aspect or the second possible implementation manner of the first aspect, in the third possible implementation manner of the first aspect, the backup wavelength channel ID information includes an upstream backup wavelength channel ID; and the switching, by the optical network unit, an operating wavelength channel of the optical network unit to a backup wavelength channel identified by the backup wavelength channel ID information includes:

switching, by the optical network unit, an upstream operating wavelength channel in operating wavelength channels of the optical network unit to an upstream backup wavelength channel identified by the upstream backup wavelength channel ID.

With reference to the first possible implementation manner of the first aspect or the second possible implementation manner of the first aspect, in the third and fourth possible implementation manners of the first aspect, the backup wavelength channel ID information includes a downstream backup wavelength channel ID and an upstream backup wavelength channel ID; and the switching, by the optical network unit, an operating wavelength channel of the optical network unit to a backup wavelength channel identified by the backup wavelength channel ID information includes: switching, by the optical network unit, a downstream operating wavelength channel in operating wavelength channels of the optical network unit to a downstream backup wavelength channel identified by the downstream backup wavelength channel ID; and switching, by the optical network unit, an upstream operating wavelength channel in the operating wavelength channels of the optical network unit to an upstream backup wavelength channel identified by the upstream backup wavelength channel ID.

With reference to the first possible implementation manner of the first aspect or the second possible implementation manner of the first aspect, in the third, fourth and fifth possible implementation manners of the first aspect, the message content field further includes operating wavelength channel ID information, where the operating wavelength channel ID information corresponds to the backup wavelength channel ID information, and the operating wavelength channel ID information includes an operating wavelength channel ID; and the switching, by the optical network unit, an operating wavelength channel of the optical network unit to a backup wavelength channel identified by the backup wavelength channel ID information includes: matching, by the optical network unit, the operating wavelength channel of the optical network unit itself to an operating wavelength channel identified by the operating wavelength channel ID in the message content field;

determining, by the optical network unit according to the matched operating wavelength channel, a backup wavelength channel identified by a backup wavelength channel ID; and switching, by the optical network unit, the operating wavelength channel of the optical network unit to the backup wavelength channel.

With reference to the first possible implementation manner of the first aspect or the second possible implementation manner of the first aspect, in the third, fourth and fifth possible implementation manners of the first aspect, the message content field further includes a protect-pair-quantity used to indicate a quantity of backup wavelength channel IDs carried in the message content field, where the backup wavelength channel IDs include the downstream backup wavelength channel ID and the upstream backup wavelength channel ID.

With reference to the first possible implementation manner of the first aspect or the second possible implementation manner of the first aspect, in the third, fourth, fifth and sixth possible implementation manners of the first aspect, a second message sent by the optical line terminal is received, where the second message includes a message type ID Message type ID field and a message content field, where the message type ID field of the second message is a channel profile ID field, a system profile field or a protect-pair-configure field, and the message content field includes an upstream backup wavelength channel ID; and the switching, by the optical network unit, an operating wavelength channel of the optical network unit to a backup wavelength channel identified by the backup wavelength channel ID information includes: switching, by the optical network unit, an upstream operating wavelength channel in the operating wavelength channels of the optical network unit to an upstream backup wavelength channel identified by the upstream backup wavelength channel ID in the second message.

According to the second aspect, a passive optical network communications method is provided, which may include: generating, by an optical line terminal, a first message, where the first message carries backup wavelength channel ID information, where the backup wavelength channel ID information is used to instruct to switch, when an optical network unit detects a fault, an operating wavelength channel of the optical network unit to a backup wavelength channel identified by the backup wavelength channel ID information; and sending the first message to the optical network unit.

With reference to the second aspect, in the first implementation manner of the second aspect, the first message includes a message type ID field and a message content field, where the message type ID field of the first message is a channel profile field, a system profile field or a protect-pair-configure field, and the message content field includes the backup wavelength channel ID information.

With reference to the second aspect or the first possible implementation manner of the second aspect, in the second possible implementation manner of the second aspect, the backup wavelength channel ID information includes a downstream backup wavelength channel ID, and the downstream backup wavelength channel ID is used to instruct to switch a downstream operating wavelength channel of the optical network unit to a downstream backup wavelength channel identified by the downstream backup wavelength channel ID; and With reference to the first aspect or the first possible implementation manner of the first aspect, in the third possible implementation manner of the first aspect, the backup wavelength channel ID information includes an upstream backup wavelength channel ID, and the upstream backup wavelength channel ID is used to instruct to switch an upstream operating wavelength channel of the optical network unit to an upstream backup wavelength channel identified by the upstream backup wavelength channel ID; and With reference to the first aspect or the first possible implementation manner of the first aspect, in the fourth possible implementation manner of the first aspect, the backup wavelength channel ID information includes a downstream backup wavelength channel ID and an upstream backup wavelength channel ID; and the downstream backup wavelength channel ID is used to instruct to switch a downstream operating wavelength channel of the optical network unit to a downstream backup wavelength channel identified by the downstream backup wavelength channel ID; and the upstream backup wavelength channel ID is used to instruct to switch an upstream operating wavelength channel of the optical network unit to an upstream backup wavelength channel identified by the upstream backup wavelength channel ID.

With reference to the first aspect or the first possible implementation manner of the first aspect, in the fifth possible implementation manner of the first aspect, the message content field further includes operating wavelength channel ID information, where the operating wavelength channel ID information corresponds to the backup wavelength channel ID information, and the operating wavelength channel ID information includes an operating wavelength channel ID, where the operating wavelength channel ID is used to: instruct the optical network unit to match an operating wavelength channel identified by the operating wavelength channel ID; and determine, according to the matched operating wavelength channel, a backup wavelength channel identified by a backup wavelength channel ID, and switch the operating wavelength channel of the optical network unit to the backup wavelength channel.

With reference to the first aspect or the first possible implementation manner of the first aspect, in the sixth possible implementation manner of the first aspect, the message content field further includes a protect-pair-quantity used to indicate a quantity of backup wavelength channel IDs in the message content field, where the backup wavelength channel IDs include the downstream backup wavelength channel ID and the upstream backup wavelength channel ID.

With reference to the first aspect or the first possible implementation manner of the first aspect, in the seventh possible implementation manner of the first aspect, a second message is sent to the optical line terminal, where the second message includes a message type ID Message type ID field and a message content field, where the message type ID field of the second message is a channel profile field, a system profile field or a protect-pair-configure field, and the message content field includes an upstream backup wavelength channel ID, where the upstream backup wavelength channel ID is used to instruct the optical network unit to switch an upstream operating wavelength channel in operating wavelength channels of the optical network unit to an upstream backup wavelength channel identified by the upstream backup wavelength channel ID in the second message.

According to the third aspect, a passive optical network communications apparatus is provided, where the communications apparatus includes:

a first communications unit, configured to: receive a first message sent by an optical line terminal, where the first message carries backup wavelength channel ID information; and perform data communication over the switched-to backup wavelength channel; and a first processing unit, configured to: when an optical network unit detects a fault, switch, according to the first message received by the first communications unit, an operating wavelength channel of the optical network unit to a backup wavelength channel identified by the backup wavelength channel ID information.

With reference to the third aspect, in a first possible implementation manner of the third aspect, the first message includes a message type ID Message type ID field and a message content field, where the message type ID field of the first message is a channel profile field, a system profile field or a protect-pair-configure field, and the message content field includes the backup wavelength channel ID information.

With reference to the third aspect and the first possible implementation manner of the third aspect, in the second possible implementation manner of the third aspect, the backup wavelength channel ID information includes a downstream backup wavelength channel ID; and the first processing unit is specifically configured to switch a downstream operating wavelength channel in operating wavelength channels of the optical network unit to a downstream backup wavelength channel identified by the downstream backup wavelength channel ID.

According to the fourth aspect, a passive optical network communications apparatus is provided, where the communications apparatus includes:

a second processing unit, configured to generate a first message, where the first message carries backup wavelength channel ID information, where the backup wavelength channel ID information is used to instruct to switch, when an optical network unit detects a fault, an operating wavelength channel of the optical network unit to a backup wavelength channel identified by the backup wavelength channel ID information; and a second communications unit, configured to send the first message to the optical network unit.

With reference to the fourth aspect, in the first possible implementation manner of the fourth aspect, the first message includes a message type ID field and a message content field, where the message type ID field of the first message is a channel profile field, a system profile field or a protect-pair-configure field, and the message content field includes the backup wavelength channel ID information.

With reference to the fourth aspect and the second possible implementation manner of the fourth aspect, in the third possible implementation manner of the fourth aspect, the backup wavelength channel ID information includes a downstream backup wavelength channel ID, and the downstream backup wavelength channel ID is used to instruct to switch a downstream operating wavelength channel of the optical network unit to a downstream backup wavelength channel identified by the downstream backup wavelength channel ID; and According to the fifth aspect, a communications apparatus is provided, where the communications apparatus includes a processor, a memory, and a bus system, where the processor is connected to the memory by using the bus system, the memory is configured to store an instruction, and the processor is configured to execute the instruction stored by the memory, where the processor is configured to generate a first message, where the first message carries backup wavelength channel ID information, where the backup wavelength channel ID information is used to instruct to switch, when an optical network unit detects a fault, an operating wavelength channel of the optical network unit to a backup wavelength channel identified by the backup wavelength channel ID information.

According to the sixth aspect, a passive optical network system is provided, where the system includes the communications apparatus described in the third aspect and the apparatus described in the fourth aspect; or the system includes the communications apparatus described in the third aspect and the apparatus described in the fifth aspect.

From the foregoing description, it can be seen that, in the implementation manners of the present invention, an optical network unit receives a first message sent by an optical line terminal, where the first message carries backup wavelength channel ID information; when the optical network unit detects a fault, the optical network unit switches an operating wavelength channel of the optical network unit to a backup wavelength channel identified by the backup wavelength channel ID information; and the optical network unit performs data communication over the switched-to backup wavelength channel. The foregoing communications method solves a problem of communication interruption caused by a fiber fault in a TWDM-PON system or a port fault of an optical line terminal, and thereby implements fast protection switching of the system and improves reliability of the system.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a PON communications method, related devices, and a PON to improve availability of a link between PON devices in a PON and improve a data transmission rate.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

Figure 1:
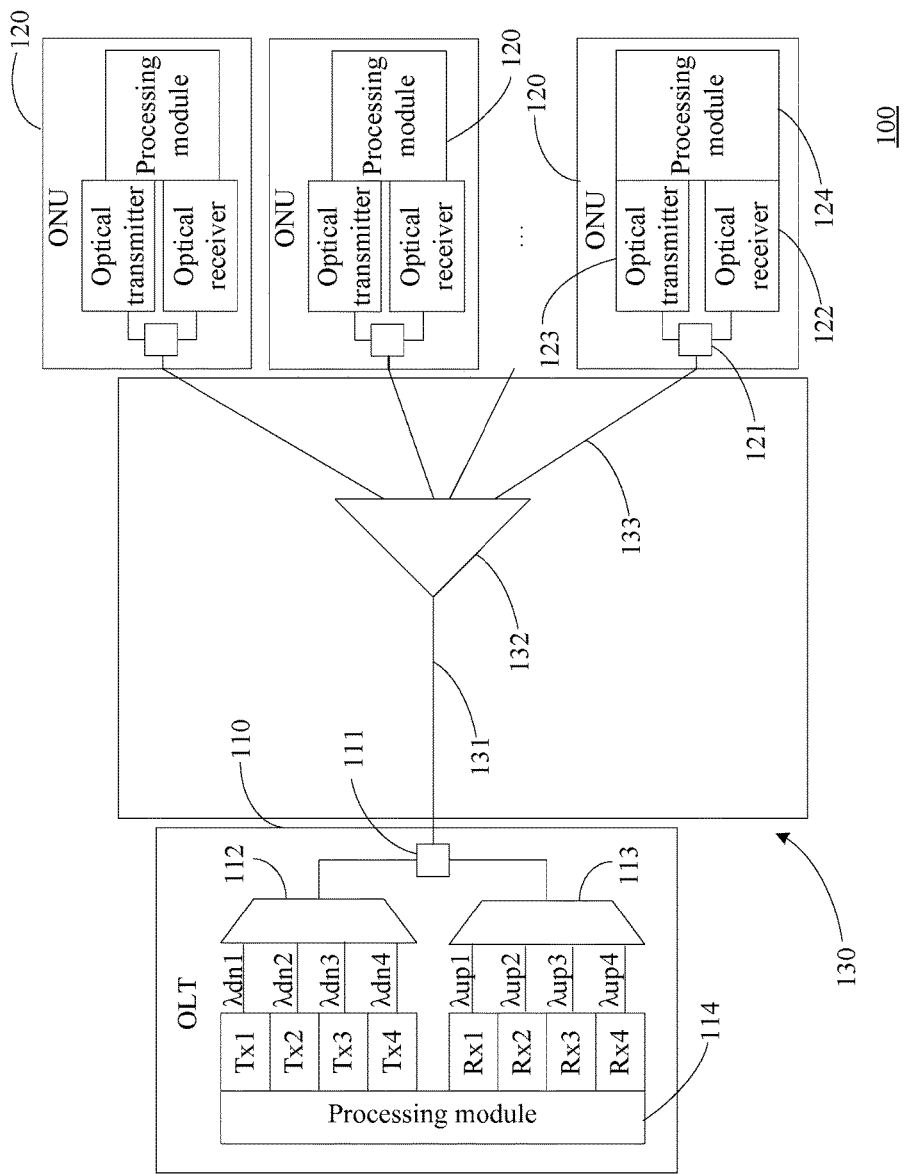
FIG. 1 is a schematic diagram of a network architecture of a TWDM-PON system according to an embodiment of the present invention.

FIG. 1 is a schematic diagram of a network architecture of a TWDM-PON system. As shown in FIG. 1, a TWDM-PON system 100 includes one OLT 110, multiple ONUs 120, and an optical distribution network (Optical Distribution Network, ODN) 130, where the OLT 110 is connected to the multiple ONUs 120 via the ODN 130 in a point-to-multipoint manner. The TWDM-PON system 100 may further include more than one OLT. The multiple ONUs 120 share an optical transmission medium of the ODN 130. The ODN 130 may include a feeder fiber 131, an optical power splitting module 132, and multiple distribution fibers 133. The optical power splitting module 132 may be disposed on a remote node (Remote Node, RN), and is connected to the OLT 110 by using the feeder fiber 131 and also connected to the multiple ONUs 120 by using the multiple distribution fibers 133. In the TWDM-PON system 100, a communications link between the OLT 110 and the multiple ONUs 120 may include multiple operating wavelength channels, and the multiple operating wavelength channels share the optical transmission medium of the ODN 130 in a WDM manner. Each ONU 120 may work on one operating wavelength channel of the TWDM-PON system 100, and each operating wavelength channel may carry services of one or more ONUs 120. In addition, ONUs 120 that work on a same operating wavelength channel may share the wavelength channel in a time division multiplexing TDM manner. In FIG. 1, that the TWDM-PON system 100 has four operating wavelength channels is used as an example for description.

It should be understood that, in practical application, a quantity of operating wavelength channels of the TWDM-PON system 100 may also be determined according to a network need.

It should be understood that, in the embodiments of the present invention, a transmission direction in which data or an optical signal that carries the data is transmitted from an OLT to an ONT/ONU is called a downstream direction, and correspondingly, the optical signal sent by the OLT to the ONT/ONU is also called a downstream optical signal. Similarly, a transmission direction in which data or an optical signal that carries the data is transmitted from the ONT/ONU to the OLT is called an upstream direction, and correspondingly, the optical signal sent by the ONT/ONU to the OLT is also called an upstream optical signal.

For ease of description, the four operating wavelength channels of the TWDM-PON system 100 in FIG. 1 are named operating wavelength channel 1, operating wavelength channel 2, operating wavelength channel 3, and operating wavelength channel 4. Each operating wavelength channel uses one pair of upstream and downstream wavelengths. For example, operating wavelength channel 1 includes an upstream operating wavelength channel and a downstream operating wavelength channel, where an upstream operating wavelength corresponding to the upstream operating wavelength channel is $\lambda up1$, and a downstream operating wavelength corresponding to the downstream operating wavelength channel may be $\lambda dn1$; operating wavelength channel 2 includes an upstream operating wavelength channel and a downstream operating wavelength channel, where an upstream operating wavelength corresponding to the upstream operating wavelength channel is $\lambda up2$, and a downstream operating wavelength corresponding to the downstream operating wavelength channel may be $\lambda dn2$; operating wavelength channel 3 includes an upstream operating wavelength channel and a downstream operating wavelength channel, where an upstream operating wavelength corresponding to the upstream operating wavelength channel is $\lambda up3$, and a downstream operating wavelength corresponding to the downstream operating wavelength channel may be $\lambda dn3$; operating wavelength channel 4 includes an upstream operating wavelength channel and a downstream operating wavelength channel, where an upstream operating wavelength corresponding to the upstream operating wavelength channel is $\lambda up4$, and a downstream operating wavelength corresponding to the downstream operating wavelength channel is $\lambda dn4$. Each operating wavelength channel may have a corresponding operating wavelength channel ID (for example, channel numbers of the four wavelength channels may be 1, 2, 3, and 4). That is, an operating wavelength channel ID is in a matching relationship with an upstream or a downstream wavelength corresponding to an operating wavelength channel identified by the operating wavelength channel ID, and the OLT 110 and the ONUs 120 can learn, according to an operating wavelength channel ID, an upstream operating wavelength and a downstream operating wavelength that are corresponding to an operating wavelength channel.

The OLT 110 may include an optical coupler 111, a first wavelength division multiplexer 112, a second wavelength division multiplexer 113, multiple downstream optical transmitters Tx1-Tx4, multiple upstream optical receivers Rx1-Rx4, and a processing module 114. The multiple downstream optical transmitters Tx1-Tx4 are connected to the optical coupler 111 via the first wavelength division multiplexer 112, the multiple upstream optical receivers Rx1-Rx4 are connected to the optical coupler 111 via the second wavelength division multiplexer 113, and the coupler 111 is further connected to the feeder fiber 131 of the ODN 130.

Transmit wavelengths vary between the multiple downstream optical transmitters Tx1-Tx4. Each downstream optical transmitter of Tx1-Tx4 may correspond to one wavelength channel of the TWDM-PON system 100. For example, the transmit wavelengths of the multiple downstream optical transmitters Tx1-Tx4 may be $\lambda d1$-$\lambda d4$ respectively. The downstream optical transmitters Tx1-Tx4 may use their respective transmit wavelengths $\lambda d1$-$\lambda d4$ to transmit downstream data to corresponding wavelength channels so that the downstream data can be received by the ONUs 120 that work on the corresponding wavelength channels. Correspondingly, receive wavelengths may vary between the multiple upstream optical receivers Rx1-Rx4. Each upstream optical receiver of Rx1-Rx4 also corresponds to one wavelength channel of the TWDM-PON system 100. For example, the receive wavelengths of the multiple upstream optical receivers Rx1-Rx4 may be $\lambda u1$-$\lambda u4$ respectively. The upstream optical receivers Rx1-Rx4 may use their respective receive wavelengths $\lambda u1$-$\lambda u4$ to receive upstream data sent by the ONUs 120 that work on corresponding wavelength channels.

The first wavelength division multiplexer 112 is configured to perform wavelength division multiplexing for the downstream data that is transmitted by the multiple downstream optical transmitters Tx1-Tx4 and whose wavelengths are $\lambda d1$-$\lambda d4$, and send the downstream data to the feeder fiber 131 of the ODN 130 via the optical coupler 111, so as to provide the downstream data for the ONUs 120 via the ODN 130. In addition, the optical coupler 111 may be further configured to provide the second wavelength division multiplexer 113 with the upstream data that comes from the multiple ONUs 120 and whose wavelengths are $\lambda u1$-$\lambda u4$, and the second wavelength division multiplexer 113 may demultiplex the upstream data whose wavelengths are $\lambda u1$-$\lambda u4$ to the upstream optical receivers Rx1-Rx4 so as to implement data reception.

The processing module 114 may be a media access control (Media Access Control, MAC) module. On the one hand, the processing module may specify operating wavelength channels for the multiple ONUs 120 by means of wavelength negotiation, and according to an operating wavelength channel of one ONU 120, provide downstream data, which is to be sent to the ONU 120, for the downstream optical transmitters Tx1-Tx4 corresponding to the wavelength channel, so that the downstream optical transmitters Tx1-Tx4 transmit the downstream data to the corresponding wavelength channel; on the other hand, the processing module 114 may further perform dynamic bandwidth allocation (Dynamic Bandwidth Allocation, DBA) for upstream transmission for each wavelength channel, and allocate an upstream transmit timeslot to ONUs 120 that are multiplexed to a same wavelength channel in a TDM manner, so as to authorize the ONUs 120 to send upstream data in the specified timeslot through the corresponding wavelength channel.

The upstream transmit wavelength and the downstream receive wavelength of each ONU 120 are adjustable. According to a wavelength channel specified by the OLT 110, an ONU 120 may adjust its own upstream transmit wavelength and downstream receive wavelength respectively to an upstream operating wavelength and a downstream operating wavelength that are corresponding to the operating wavelength channel, so as to implement upstream and downstream data transmission and reception by using the wavelength channel. For example, if the OLT 110 instructs, in a wavelength negotiation process, one ONU 120 to work on wavelength channel 1, the ONU 120 may adjust its own upstream transmit wavelength and downstream receive wavelength to a first upstream operating wavelength $\lambda up1$ and a first downstream operating wavelength $\lambda dn1$ respectively; if the OLT 110 instructs the ONU 120 to work on wavelength channel 3, the ONU 120 may adjust its own upstream transmit wavelength and downstream receive wavelength to a third upstream operating wavelength $\lambda up3$ and a third downstream operating wavelength $\lambda dn3$ respectively.

The ONU 120 may include an optical coupler 121, a downstream optical receiver 122, an upstream optical transmitter 123, and a processing module 124. The downstream optical receiver 122 and the upstream optical transmitter 123 are connected to a distribution fiber 133 corresponding to the ONU 120 via the optical coupler 121. On the one hand, the optical coupler 121 may provide the distribution fiber 133 of the ODN 130 with upstream data sent by the upstream optical transmitter 123, so as to send the upstream data to the OLT 110 via the ODN 130; on the other hand, the optical coupler 121 may further provide the downstream optical receiver 122 with downstream data sent by the OLT 110 via the ODN 130, so as to implement data reception.

The processing module 124 may be a media access control MAC module or a microprocessor, and may perform wavelength negotiation with the OLT 110, and according to an operating wavelength channel specified by the OLT 110, adjust a receive wavelength of the downstream optical receiver 122 and a transmit wavelength of the upstream optical transmitter 123 (that is, adjust the downstream receive wavelength and upstream transmit wavelength of the ONU 120), so that the ONU 120 works on the operating wavelength channel specified by the OLT 110. In addition, the processing module 124 may further control, according to a dynamic bandwidth allocation result of the OLT 110, the upstream optical transmitter 123 to send upstream data in a specified timeslot.

It should be understood that in the embodiments of the present invention, the passive optical network communications method, apparatus and system according to the embodiments of the present invention may be applied in a time division or wavelength division passive optical network system, for example, a GPON system, a 10G GPON system, a 40G GPON system, an Ethernet passive optical network (Ethernet Passive Optical Network, "EPON" for short) system, a 10G EPON system or a wavelength division multiplexing passive optical network WDM PON system. For ease of description, a GPON system is used as an example for description below, but the present invention is not limited thereto. In addition, for ease of description, an optical network unit (Optical Network Unit, ONU) is used for description below in place of an optical network terminal (Optical Network Terminal, ONT) and/or an optical network unit, but the present invention is not limited thereto.

Figure 2:
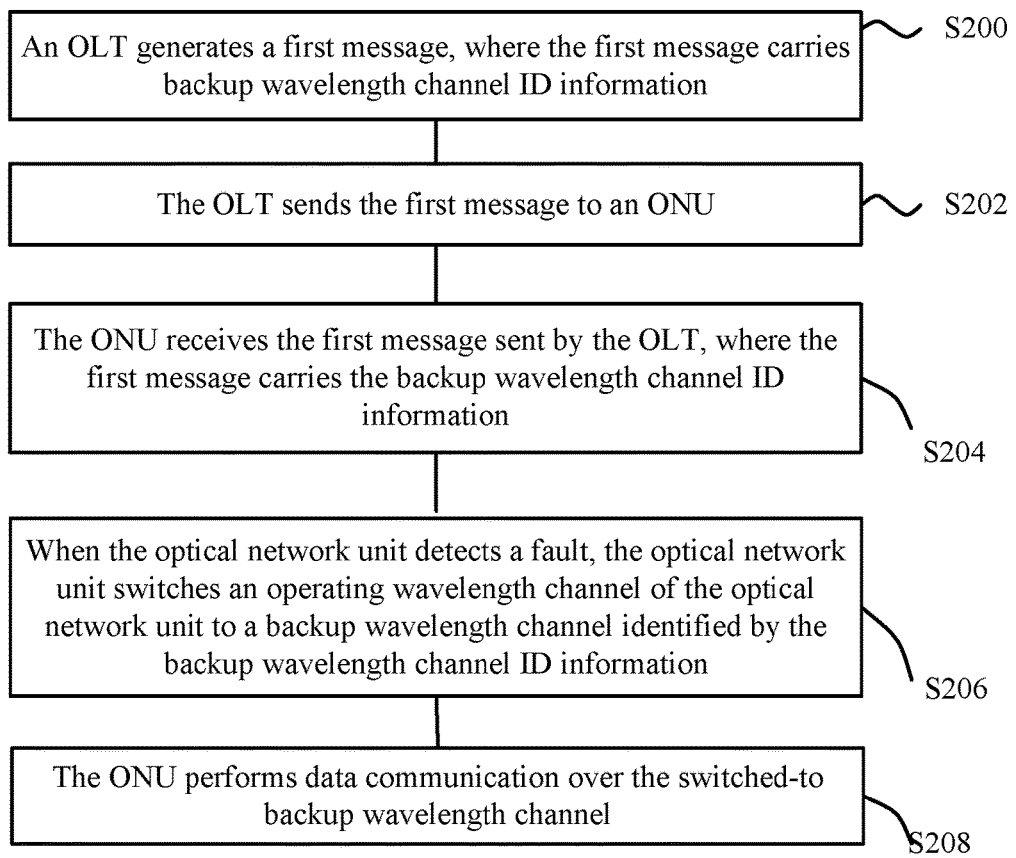
FIG. 2 is a schematic flowchart of a passive optical network communications method according to an embodiment of the present invention.

FIG. 2 gives a schematic flowchart of a passive optical network communications method according to an embodiment of the present invention. The method may be executed by an apparatus that executes the communications method. For example, the method may be executed by an ONU or an OLT. Herein, an ONU is used as an example for description. As shown in FIG. 2, the method includes:

S200. An OLT generates a first message, where the first message carries backup wavelength channel ID information.

Further, the backup wavelength channel ID information is used to instruct to switch, when an optical network unit detects a fault, an operating wavelength channel of the optical network unit to a backup wavelength channel identified by the backup wavelength channel ID information.

Further, the first message includes a message type ID Message type ID field and a message content field, where the message type ID field of the first message is a channel profile field, a system profile field or a protect-pair-configure field, and the message content field includes the backup wavelength channel ID information.

Specifically, the message type ID field is used to identify a type of the message, and the message content field is used to describe message content corresponding to the message type ID field.

Further, the backup wavelength channel ID information includes a downstream backup wavelength channel ID, where the downstream backup wavelength channel ID is used to identify a downstream backup wavelength channel, and specifically instruct the ONU to switch a downstream operating wavelength channel of the ONU to the downstream backup wavelength channel identified by the downstream backup wavelength channel ID.

Further, the backup wavelength channel ID information includes an upstream backup wavelength channel ID, where the upstream backup wavelength channel ID is used to identify an upstream backup wavelength channel, and specifically instruct the ONU to switch an upstream operating wavelength channel of the ONU to the upstream backup wavelength channel identified by the upstream backup wavelength channel ID.

Further, the backup wavelength channel ID information includes a downstream backup wavelength channel ID and an upstream backup wavelength channel ID, where the downstream backup wavelength channel ID is used to instruct to switch a downstream operating wavelength channel of the optical network unit to a downstream backup wavelength channel identified by the downstream backup wavelength channel ID; and the upstream backup wavelength channel ID is used to instruct to switch an upstream operating wavelength channel of the optical network unit to an upstream backup wavelength channel identified by the upstream backup wavelength channel ID.

Further, the message content field further includes operating wavelength channel ID information, where the operating wavelength channel ID information corresponds to the backup wavelength channel ID information, and the operating wavelength channel ID information includes an operating wavelength channel ID, where the operating wavelength channel ID is used to instruct the ONU to: match an operating wavelength channel identified by the operating wavelength channel ID; according to the matched operating wavelength channel, determine a backup wavelength channel identified by a backup wavelength channel ID; and switch the operating wavelength channel of the ONU to the backup wavelength channel.

Further, the message content field further includes a protect-pair-quantity used to indicate a quantity of backup wavelength channel IDs in the message content field, where the backup wavelength channel IDs include the downstream backup wavelength channel ID and the upstream backup wavelength channel ID.

S202. The OLT sends the first message to an ONU.

Further, the method further includes: sending, by the OLT, a second message to the ONU, where the second message includes a message type ID Message type ID field and a message content field, where the message type ID field of the second message is a channel profile field, a system profile field or a protect-pair-configure field, and the message content field includes an upstream backup wavelength channel ID, where the upstream backup wavelength channel ID is used to instruct the optical network unit to switch an upstream operating wavelength channel in operating wavelength channels of the optical network unit to an upstream backup wavelength channel identified by the upstream backup wavelength channel ID in the second message.

S204. The ONU receives the first message sent by the OLT, where the first message carries the backup wavelength channel ID information.

S206. When the optical network unit detects a fault, the optical network unit switches an operating wavelength channel of the optical network unit to a backup wavelength channel identified by the backup wavelength channel ID information.

The fault may include loss of optical signal, loss of frame, a high bit error rate, or the like.

Further, the backup wavelength channel ID information includes a downstream backup wavelength channel ID.

That the optical network unit switches an operating wavelength channel of the optical network unit to a backup wavelength channel identified by the backup wavelength channel ID information includes:

switching, by the optical network unit, a downstream operating wavelength channel in operating wavelength channels of the optical network unit to a downstream backup wavelength channel identified by the downstream backup wavelength channel ID.

Further, the backup wavelength channel ID information includes an upstream backup wavelength channel ID.

That the optical network unit switches an operating wavelength channel of the optical network unit to a backup wavelength channel identified by the backup wavelength channel ID information includes:

switching, by the optical network unit, an upstream operating wavelength channel in operating wavelength channels of the optical network unit to an upstream backup wavelength channel identified by the upstream backup wavelength channel ID.

Further, the backup wavelength channel ID information includes a downstream backup wavelength channel ID and an upstream backup wavelength channel ID.

That the optical network unit switches an operating wavelength channel of the optical network unit to a backup wavelength channel identified by the backup wavelength channel ID information includes:

switching, by the optical network unit, a downstream operating wavelength channel in operating wavelength channels of the optical network unit to a downstream backup wavelength channel identified by the downstream backup wavelength channel ID; and switching, by the optical network unit, an upstream operating wavelength channel in the operating wavelength channels of the optical network unit to an upstream backup wavelength channel identified by the upstream backup wavelength channel ID.

Further, the message content field further includes operating wavelength channel ID information, where the operating wavelength channel ID information corresponds to the backup wavelength channel ID information, and the operating wavelength channel ID information includes an operating wavelength channel ID.

That the optical network unit switches an operating wavelength channel of the optical network unit to a backup wavelength channel identified by the backup wavelength channel ID information includes:

matching, by the optical network unit according to its own operating wavelength channel, an operating wavelength channel identified by the operating wavelength channel ID in the message content field;

determining, by the optical network unit according to the matched operating wavelength channel, a backup wavelength channel identified by a backup wavelength channel ID; and switching, by the optical network unit, the operating wavelength channel of the optical network unit to the backup wavelength channel.

Further, the message content field further includes a protect-pair-quantity used to indicate a quantity of backup wavelength channel IDs carried in the message content field, where the backup wavelength channel IDs include the downstream backup wavelength channel ID and the upstream backup wavelength channel ID.

Further, the method further includes:

receiving, by the ONU, a second message sent by the OLT, where the second message includes a message type ID Message type ID field and a message content field, where the message type ID field of the second message is a channel profile ID field, a system profile field or a protect-pair-configure field, and the message content field includes an upstream backup wavelength channel ID.

That the optical network unit switches an operating wavelength channel of the optical network unit to a backup wavelength channel identified by the backup wavelength channel ID information includes:

switching, by the optical network unit, an upstream operating wavelength channel in the operating wavelength channels of the optical network unit to an upstream backup wavelength channel identified by the upstream backup wavelength channel ID in the second message.

S208. The optical network unit performs data communication over the switched-to backup wavelength channel.

To sum up, for ease of understanding, the backup wavelength channel ID information and the operating wavelength channel ID information are explained below:

the backup wavelength channel ID information includes a backup wavelength channel ID, where the backup wavelength channel ID includes a downstream backup wavelength channel ID, or an upstream backup wavelength channel ID, or a downstream backup wavelength channel ID and an upstream backup wavelength channel ID.

The downstream backup wavelength channel ID is used to identify a downstream backup wavelength channel; the upstream backup wavelength channel ID is used to identify an upstream backup wavelength channel.

In other words, the backup wavelength channel ID information includes a backup wavelength channel ID, where the backup wavelength channel ID is used to identify a backup wavelength channel, where the backup wavelength channel includes a downstream backup wavelength channel identified by a downstream backup wavelength channel ID or an upstream backup wavelength channel identified by an upstream backup wavelength channel ID; or includes a downstream backup wavelength channel identified by a downstream backup wavelength channel ID and an upstream backup wavelength channel identified by an upstream backup wavelength channel ID.

Correspondingly, the operating wavelength channel ID information may also be understood as follows:

the operating wavelength channel ID information includes an operating wavelength channel ID, where the operating wavelength channel ID includes a downstream operating wavelength channel ID, or an upstream operating wavelength channel ID, or a downstream operating wavelength channel ID and an upstream operating wavelength channel ID.

The downstream operating wavelength channel ID is used to identify a downstream operating wavelength channel; the upstream wavelength channel ID is used to identify an upstream operating wavelength channel.

In other words, the operating wavelength channel ID information includes an operating wavelength channel ID, where the operating wavelength channel ID is used to identify an operating wavelength channel, where the operating wavelength channel includes a downstream operating wavelength channel identified by a downstream operating wavelength channel ID or an upstream operating wavelength channel identified by an upstream operating wavelength channel ID; or includes a downstream operating wavelength channel identified by a downstream operating wavelength channel ID and an upstream operating wavelength channel identified by an upstream operating wavelength channel ID.

It should be understood that the foregoing description and definitions related to the backup wavelength channel ID information and the operating wavelength channel ID information are applicable to all the following various embodiments.

Optionally, the first message and the second message may be any one of a physical layer operations, administration and maintenance (Physical Layer Operation Administration and Maintenance, PLOAM) message, an ONT management and control interface (ONT Management and Control Interface, OMCI) message, a Multi-Point Control Protocol (Multi-Point Control Protocol, MPCP) message, and an operation, administration and maintenance (Operation Administration and Maintenance, OAM) message, or may be other messages.

The OLT may use one of the PLOAM message, the OMCI message, the MPCP message and the OAM message to carry the backup wavelength channel ID information. A specific message format, for example, field values, field lengths, and positions of fields in the message may be determined according to actual needs. In other alternative embodiments, the OLT may use a newly defined message to carry the backup wavelength channel ID information.

In the embodiments of the present invention, an ONU performs preconfiguration according to backup wavelength channel ID information sent by an OLT. When the ONU detects a fault, according to preconfigured backup wavelength channel information, the ONU quickly switches its own operating wavelength channel to a backup wavelength channel corresponding to the backup wavelength channel information so as to perform data communication over the switched-to backup wavelength channel, thereby implementing fast protection switching of a passive optical network system and improving reliability of the system.

The following gives description by using examples with reference to fault scenarios of a passive optical network system, but scenarios to which the solutions in the embodiments of the present invention are applied are not limited to the following fault scenarios.

Embodiment 1

Figure 3:
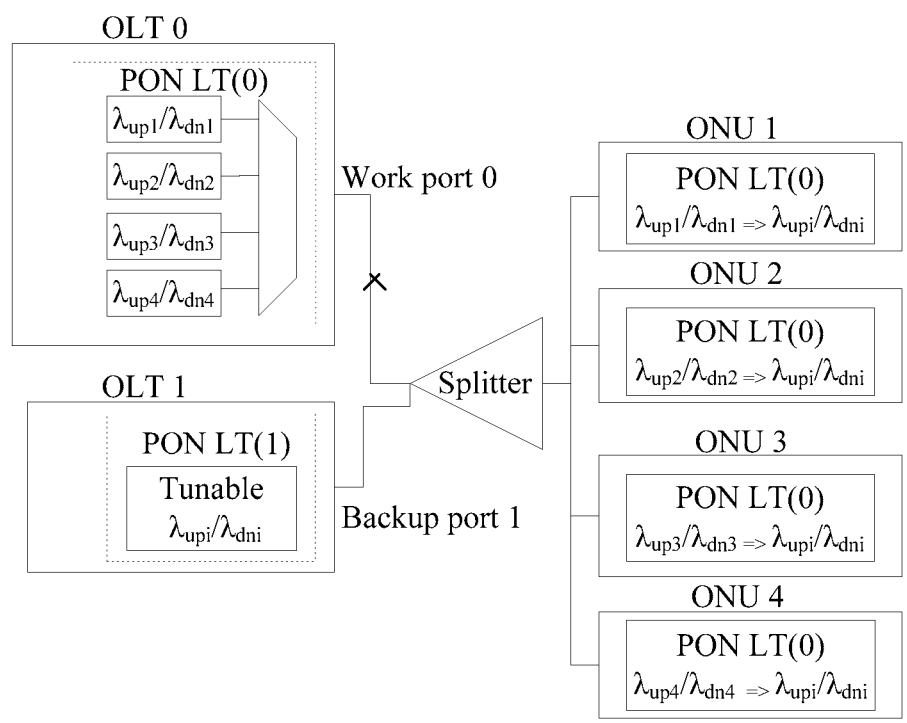
FIG. 3 is a compositional architecture diagram of active/standby switching according to an embodiment of the present invention.

As shown in FIG. 3, FIG. 3 is a compositional architecture diagram of active/standby switching. In FIG. 3, OLT 0 is an active OLT, and OLT 1 is a standby OLT. Working port 0 of the active OLT is connected to an optical splitter by using a feeder fiber. Standby port 1 of the standby OLT is connected to the optical splitter by using a standby fiber, and the other end of the optical splitter is connected to ONUs, where data is transmitted between the active OLT or the standby OLT and the ONUs in real time via the optical splitter.

The active OLT, that is, OLT 0, includes at least 4 transceivers: transceiver 1, transceiver 2, transceiver 3, and transceiver 4. Each transceiver works on one operating wavelength channel, and each wavelength channel uses one pair of upstream and downstream operating wavelengths. For example, transceiver 1 works on operating wavelength channel 1, and operating wavelength channel 1 includes an upstream operating wavelength channel and a downstream operating wavelength channel, where the upstream operating wavelength channel corresponds to an upstream operating wavelength channel $\lambda up1$ and the downstream operating wavelength channel corresponds to a downstream operating wavelength $\lambda dn1$. By analogy, transceiver 2 works on wavelength channel 2, and wavelength channel 2 uses an upstream operating wavelength $\lambda up2$ and a downstream operating wavelength $\lambda dn2$.

The standby OLT, that is, OLT 1, includes at least one transceiver: transceiver 5. Transceiver 5 works on a backup wavelength channel, and an upstream backup wavelength and a downstream backup wavelength corresponding to the backup wavelength channel are $\lambda upi$ and $\lambda dni$. Values of the upstream backup wavelength and the downstream backup wavelength corresponding to the backup wavelength channel may be one of the foregoing operating wavelength channels, or may be a wavelength corresponding to another wavelength channel different from the foregoing operating wavelength channels. For example, a value of $\lambda upi$ may be any one of $\lambda up1$-$\lambda up4$ and $\lambda up5$. A value of $\lambda dni$ may be any one of $\lambda up1$-$\lambda up4$ and $\lambda up5$.

Operating wavelength channel ID information includes an operating wavelength channel ID. The operating wavelength channel ID is used to identify an operating wavelength channel. The operating wavelength channel may be an upstream operating wavelength channel or a downstream operating wavelength channel. The upstream operating wavelength channel corresponds to an upstream operating wavelength, and the downstream operating wavelength channel corresponds to a downstream operating wavelength.

The ONUs, for example, ONU 1 . . . ONU 4, may be adjustable ONUs. Any one ONU includes at least one transceiver. The transceiver works on an operating wavelength channel. For example, ONU 1 includes transceiver 1, and transceiver 1 works on operating wavelength channel 1, and operating wavelength channel 1 uses an upstream operating wavelength $\lambda up1$ and a downstream operating wavelength $\lambda dn1$. The operating wavelength channel is identified by the operating wavelength channel ID. For example, an operating wavelength channel ID 1 identifies operating wavelength channel 1.

When the active OLT communicates with the ONUs normally, the active OLT sends a message that carries backup wavelength channel ID information to the ONUs, so that the ONUs receive the message and preconfigure the backup wavelength channel ID information.

When working port 0 of the active OLT, or the feeder fiber between the active OLT and the optical splitter is faulty, the standby OLT is enabled. The standby OLT uses a backup wavelength channel to send data to the ONUs.

When detecting a fault, an ONU switches its own operating wavelength channel to a preconfigured backup wavelength channel. Because the backup wavelength channel ID information preconfigured by the multiple ONUs is the same, the ONUs all switch to the same backup wavelength channel. In this case, a manner of communication between the standby OLT and the ONUs is time division multiplexing. That is, in an upstream direction, the ONUs send data to the standby OLT in a time division manner; in a downstream direction, the OLT delivers data to the ONUs in a broadcast manner.

Figure 4:
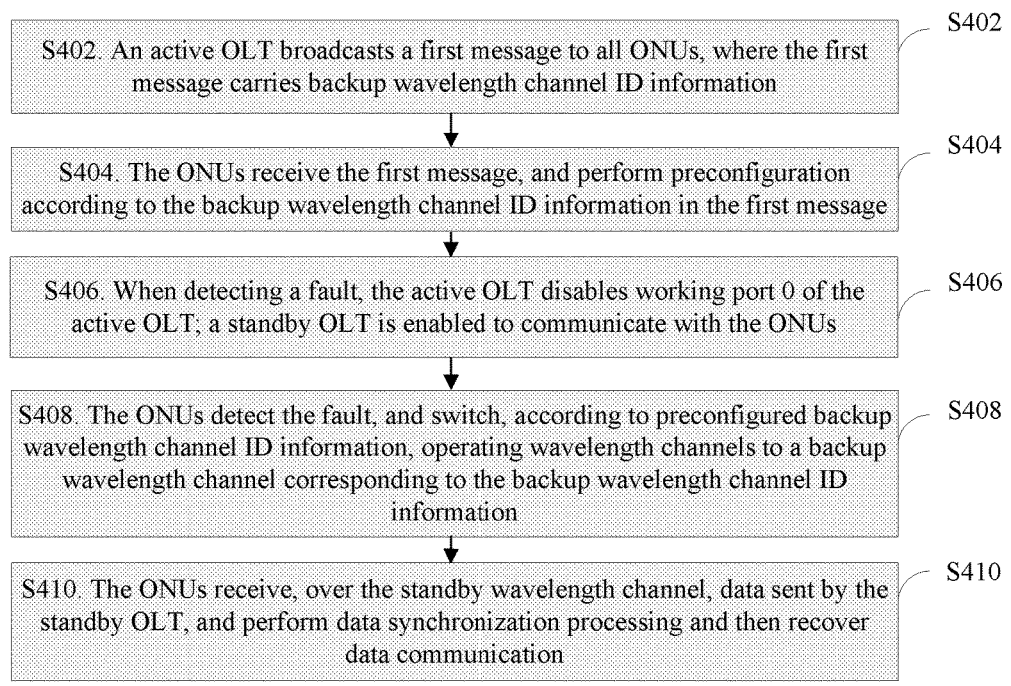
FIG. 4 is a schematic flowchart of another passive optical network communications method according to an embodiment of the present invention.

Based on the architecture in FIG. 3, an embodiment of the present invention provides another passive optical network communications method, as shown in FIG. 4.

S402. An active OLT broadcasts a first message to all ONUs, where the first message carries backup wavelength channel ID information.

Further, that a PLOAM message is used to carry the backup wavelength channel ID information is used as an example. A message format of the PLOAM message is shown in Table 1. Table 1 is a schematic diagram of a PLOAM message format. The PLOAM message generally includes an optical network unit ID (ONU ID) field, a message type ID (Message type ID) field, a sequence number (Sequence No) field, a message content (Message Content) field, and a message integrity check (Message Integrity Check) field. In this embodiment of the present invention, the backup wavelength channel ID information may be carried in the message content field of the PLOAM message. For example, the PLOAM message format based on the backup wavelength channel ID information is shown in Table 1.

TABLE 1

| Octet (Octet) | Content (Content) | Description (Description) |
|---|---|---|
| 1-2 | ONU ID (ONU ID) | ID of an optical network unit that needs to switch to a backup wavelength channel |
| 3 | Message type ID (Message type ID) | Identifies a type of the message. |
| 4 | Sequence number (Sequence No) | Sequence number |
| 5-40 | Message content (Message Content) | Carries backup wavelength channel ID information. |
| 41-48 | Message integrity check (MIC) | Message integrity check |

Optionally, the message type ID field of the PLOAM message may be a channel profile field, a system profile field or a protect-pair-configure field. When the message type ID field is a channel profile field, a system profile field or a protect-pair-configure field, the message content field includes backup wavelength channel ID information, where the backup wavelength channel ID information specifically includes at least one of a downstream backup wavelength channel ID and an upstream backup wavelength channel ID, as detailed in Table 2:

TABLE 2

| Octet | Content | Description |
|---|---|---|
| 1-2 | ONU-ID | Broadcast message to all ONUs of one downstream wavelength. As a broadcast to all ONUs, ONU-ID = 0x03FF. |
| 3 | Message type ID | Channel profile or system profile |
| 4 | SeqNo | Broadcast or Unicast PLOAM sequence number. |

TABLE 2-continued

| Octet | Content | Description |
|---|---|---|
| 5 | Backup wavelength channel ID information | DDDD: ID of a downstream backup wavelength channel (ID of downstream backup wavelength channel) UUUU: ID of an upstream backup wavelength channel (ID of upstream backup wavelength channel) |
| 6-40 | Padding | Set to 0x00 by the transmitter; treated as "don't care" by the receiver. |
| 41-48 | MIC | Message integrity check. |

In Table 2, octets 1-2 in the PLOAM message are an ONU ID field ONU-ID, and are generally padded with 0X03FF for a broadcast message, which is not limited thereto. Octet 3 is a message type type field Message type ID, and is generally a channel profile "channel profile" or a system profile "system profile", Octet 4 is a SeqNo sequence number, and is a sequence number (sequence number) of a broadcast (Broadcast) or unicast (Unicast) PLOAM message. Octet 5 is backup wavelength channel ID (Backup wavelength channel ID) information, which may specifically include at least one of: ID of a downstream backup wavelength channel (ID of downstream backup wavelength channel) and ID of an upstream backup wavelength channel (ID of upstream backup wavelength channel). DDDD may be used to represent an ID of a downstream backup wavelength channel. For example, a value 0000 of DDDD represents an ID of downstream backup wavelength channel 0. UUUU is used to represent an ID of an upstream backup wavelength channel. For example, a value 1111 of UUUU represents an ID of upstream backup wavelength channel 15. Octets 6-40 may be padded with 0X00, and octets 41-48 are used for message integrity check. Octet 5 is a new field.

In Table 2 that describes the PLOAM message operating wavelength channel ID information (work wavelength channel ID information) of the ONU is not described. The operating wavelength channel ID information of the ONU may be further padded in another unpadded field. In Embodiment 1, the operating wavelength channel ID information is optional.

Further, that a PLOAM message is used to carry the backup wavelength channel ID information is used as an example. A message format of the PLOAM message may also be those shown in Table 3 and Table 4. Table 3 and Table 4 are schematic diagrams of PLOAM message formats.

A main different between the PLOAM message formats shown in Table 3 and Table 4 and that in Table 2 is that the downstream backup wavelength channel ID and upstream backup wavelength channel ID included in the backup wavelength channel ID information are separately carried by two PLOAM messages, as detailed in Table 3 and Table 4.

TABLE 3

| Octet | Content | Description |
|---|---|---|
| 1-2 | ONU ID | Broadcast message to all ONUs of one downstream wavelength. As a broadcast to all ONUs, ONU-ID = 0x03FF. |
| 3 | Message Type ID | Downstream_Channel_Profile |
| 4 | SeqNo | Broadcast or Unicast PLOAM sequence number. |
| 5 | Profile version and profile index | If the content of the profile changes, the OLT should ensure that the version also changes, so that the ONU can detect updates solely on the basis of the version field. |

TABLE 3-continued

| Octet | Content | Description |
|---|---|---|
| 6 | Downstream wavelength channel ID | ID of the downstream wavelength channel |
| 7 | Downstream backup wavelength channel ID | ID of the downstream wavelength backup channel |
| ... | | |
| n-40 | Padding | Set to 0x00 by the transmitter; treated as "don't care" by the receiver. |
| 41-48 | MIC | Message integrity check |

As shown in Table 3, octets 1-2 are still an ONU ID field, and its content is the same as the content of this field in Table 2. Octet 3 is a message type ID, and the message type ID identifies a downstream channel profile Downstream_Channel_Profile. Octet 4 is a sequence number field; for content of this field, refer to Table 2. Octet 5 is a profile version (Profile version) and profile index (Profile index) field, and this field is a field for updating a profile when the profile changes. Octet 6 is a downstream wavelength channel ID (Downstream wavelength channel ID) field, which represents a downstream wavelength channel of the ONU. Octet 7 is a Downstream backup wavelength channel ID field, which represents a downstream backup wavelength channel ID of the ONU and identifies the downstream backup wavelength channel of the ONU. The other octets numbered n-40 may be padded randomly or padded according to specified requirements. Descriptions of octets 41-48 are the same as those in Table 2. Octet 7 is a new field.

The downstream backup wavelength channel ID in the backup wavelength channel ID information in Table 3 may be carried in the Downstream backup wavelength channel ID field of the PLOAM message. In Table 3, except that the backup wavelength channel ID information is a mandatory field of the PLOAM message, all other fields are optional.

Further, as shown in Table 4, Table 4 is a PLOAM message in another format. The message format is detailed below.

TABLE 4

| Octet | Content | Description |
|---|---|---|
| 1-2 | ONU-ID | Broadcast message to all ONUs of one downstream wavelength. As a broadcast to all ONUs, ONU-ID = 0x03FF. |
| 3 | Message Type (to be assigned) | Upstream_Channel_Profile |
| 4 | SeqNo | Broadcast or Unicast PLOAM sequence number. |
| 5 | Profile version and profile index | If the content of the profile changes, the OLT should ensure that the version also changes, so that the ONU can detect updates solely on the basis of the version field. |
| 6 | Upstream wavelength channel ID | ID of the upstream wavelength channel |
| 7 | Upstream backup wavelength channel ID | ID of the upstream backup wavelength channel |
| ... | | |
| n-40 | Padding | Set to 0x00 by the transmitter; treated as "don't care" by the receiver. |
| 41-48 | MIC | Message integrity check |

The content in Table 4 shows that octets 1-2 are still an ONU ID field, and its content is the same as the content of this field in Table 2. Octet 3 is a message type ID, and the message type ID identifies an upstream channel profile upstream_Channel_Profile; Octet 4 is a sequence number field; for content of this field, refer to Table 2. Octet 5 is a profile version (Profile version) and profile index (Profile index) field, and this field is a field for updating a profile when the profile changes. Octet 6 is an upstream wavelength channel ID (Upstream wavelength channel ID) field, which represents an upstream wavelength channel of the ONU. Octet 7 is an upstream backup wavelength channel ID (Upstream backup wavelength channel ID) field, which represents an upstream backup wavelength channel ID of the ONU and is used to identify an upstream backup wavelength channel of the ONU. The other octets numbered n-40 may be padded randomly or padded according to specified requirements. Descriptions of octets 41-48 are the same as those in Table 2. Octet 7 in Table 4 is a new field.

In Table 3 and Table 4 that describe the PLOAM message, operating wavelength channel ID information (work wavelength channel ID information) of the ONU is not described. The operating wavelength channel ID information of the ONU may be further padded in another unpadded field. The operating wavelength channel ID information is optional.

In summary, when the backup channel ID information includes downstream backup wavelength channel ID information and an upstream backup wavelength channel ID, two scenarios exist. A first scenario is: The backup channel ID information in the first message delivered by the OLT includes downstream backup wavelength channel ID information and upstream backup wavelength channel ID information, and therefore the first message received by the ONU also includes the foregoing two types of information.

A second scenario is: The backup channel ID information in the first message delivered by the OLT includes only the downstream backup wavelength channel ID information. In this case, the OLT may further send a second message to the ONU, where the second message carries the upstream backup wavelength channel ID information, and the ONU also needs to receive the second message that carries the upstream backup wavelength channel ID information. For a format of the second message, reference may be made to Table 4 and corresponding descriptions in Table 4, and details are not repeated herein.

It should be understood that, in this embodiment of the present invention, an order and positions of the content of the octets in Table 3 and Table 4 are changeable. For example, octets 1-2 represent backup wavelength channel ID (Backup wavelength channel ID) information, and octet 5 is used to represent an ONU ID, which may change randomly without being limited to the foregoing form so long as it is ensured that at least one octet in the PLOAM message represents the backup wavelength channel ID (Backup wavelength channel ID) information. In addition, in all the foregoing PLOAM message formats, except that the backup wavelength channel ID information is a mandatory field of the message format, all other fields are optional.

S404. The ONUs receive the first message, and perform preconfiguration according to the backup wavelength channel ID information in the first message.

Specifically, in the networking architecture diagram in FIG. 3, after receiving the first message, the ONUs prestore the backup wavelength channel ID information that is in the first message. In the architecture shown in FIG. 3, the backup wavelength channel ID information stored by the ONUs is all the same. The backup wavelength channel ID information is preconfigured in the ONUs. Therefore, after detecting a fault, an ONU switches to a backup wavelength channel corresponding to the preconfigured backup wavelength channel ID information.

By using the PLOOM message in Table 2 to Table 4, the backup wavelength channel ID information is carried in the message and delivered to the ONUs. Therefore, according to the message, the ONUs preconfigure the backup wavelength channel corresponding to the backup wavelength channel ID information. In this way, when detecting a fault, an ONU can quickly switch to the backup wavelength channel, thereby reducing interruption time and improving reliability of a system.

S406. When detecting a fault, the active OLT disables working port 0 of the active OLT; a standby OLT is enabled to communicate with the ONUs.

Specifically, when the active OLT communicates with the ONUs normally, the active OLT receives and transmits data by using working port 0, and standby port 1 of the standby OLT is in a sending-disabled and receiving-enabled state, that is, by using standby port 1, the standby OLT can synchronously receive data sent by the ONUs but is forbidden from sending data to the ONUs.

When detecting a fault, the active OLT determines that working port 0 of the active OLT is faulty or that a feeder fiber between the active OLT and an optical splitter is faulty. Then, the OLT disables working port 0 of the active OLT so that the OLT is forbidden from sending data to the ONUs. In this case, after a fault occurs, the standby OLT enables receiving and transmitting of data, that is, enables a data sending function, and periodically sends consecutive downstream data to the ONUs by using standby port 1.

S408. The ONUs detect the fault, and switch, according to preconfigured backup wavelength channel ID information, operating wavelength channels to a backup wavelength channel corresponding to the backup wavelength channel ID information.

Specifically, based on the networking architecture in FIG. 3, after the active OLT is switched to the standby OLT, the ONUs all switch to the same backup wavelength channel and send data in a time division multiplexing manner.

S410. The ONUs receive, over the standby wavelength channel, data sent by the standby OLT, and perform data synchronization processing and then recover data communication.

Over the downstream backup wavelength channel corresponding to the downstream backup wavelength channel ID information, the ONUs receive data that is delivered by the OLT in a broadcast manner; over the upstream backup wavelength channel corresponding to the upstream backup wavelength channel ID information, the ONUs send data to the standby OLT in a time division manner. Therefore, data communication between the ONUs and the standby OLT is recovered.

In this embodiment of the present invention, an ONU performs preconfiguration according to backup wavelength channel ID information sent by an OLT. When the ONU detects a fault, according to preconfigured backup wavelength channel information, the ONU quickly switches its own operating wavelength channel to a backup wavelength channel corresponding to the backup wavelength channel information so as to perform data communication over the switched-to backup wavelength channel, thereby implementing fast protection switching of a passive optical network system and improving reliability of the system.

Embodiment 2

Figure 5:
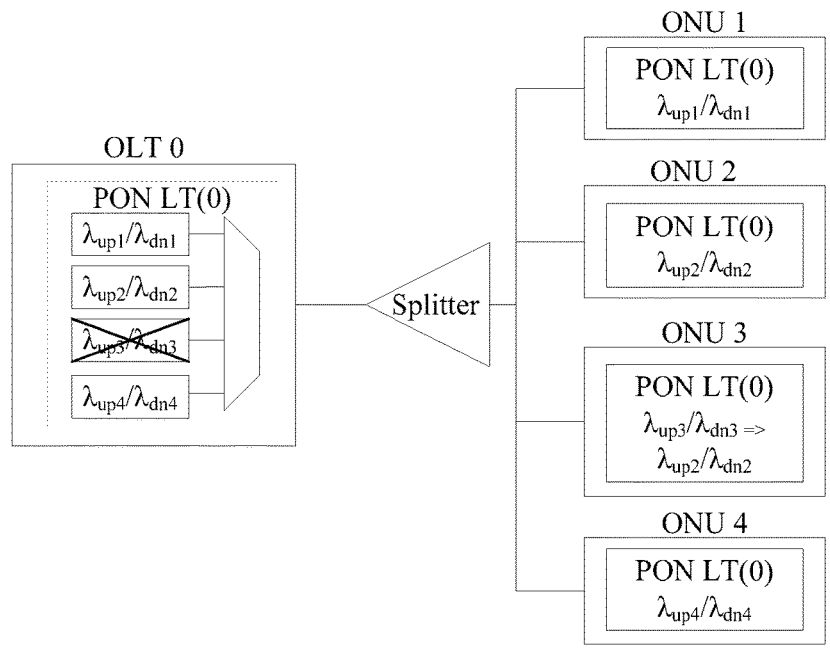
FIG. 5 is another compositional architecture diagram of active/standby switching according to an embodiment of the present invention.

As shown in FIG. 5, FIG. 5 is another compositional architecture diagram of active/standby switching. The structure of OLT 0 in FIG. 5 is the same as the structure of the active OLT, that is, OLT 0, in FIG. 3. For a specific structure of OLT 0, refer to the description of FIG. 3, and no repeated description is given herein.

In the active/standby switching architecture diagram of FIG. 5, OLT 0 predetermines a protection relationship between operating wavelength channels of OLT 0. For example, operating wavelength channel 2 of the OLT is used as a backup wavelength channel of operating wavelength channel 3. That is, a protection relationship is established between operating wavelength channel 2 and operating wavelength channel 3. The protection relationship is represented by operating wavelength channel ID information and backup wavelength channel ID information in a PLOAM message, and the message is delivered to all ONUs.

After receiving the message, ONU 3 that uses operating wavelength channel 3 uses operating wavelength channel 2 as its own backup wavelength channel. When detecting a fault, ONU 3 switches the operating wavelength channel of ONU 3 to operating wavelength channel 2 to receive and transmit data. Because all transceivers of OLT 0 work on fixed operating wavelength channels, when detecting a fault, OLT 0 disables transceiver 3 and uses other transceivers such as transceiver 1, transceiver 2, and transceiver 4 to receive and transmit data.

Figure 6:
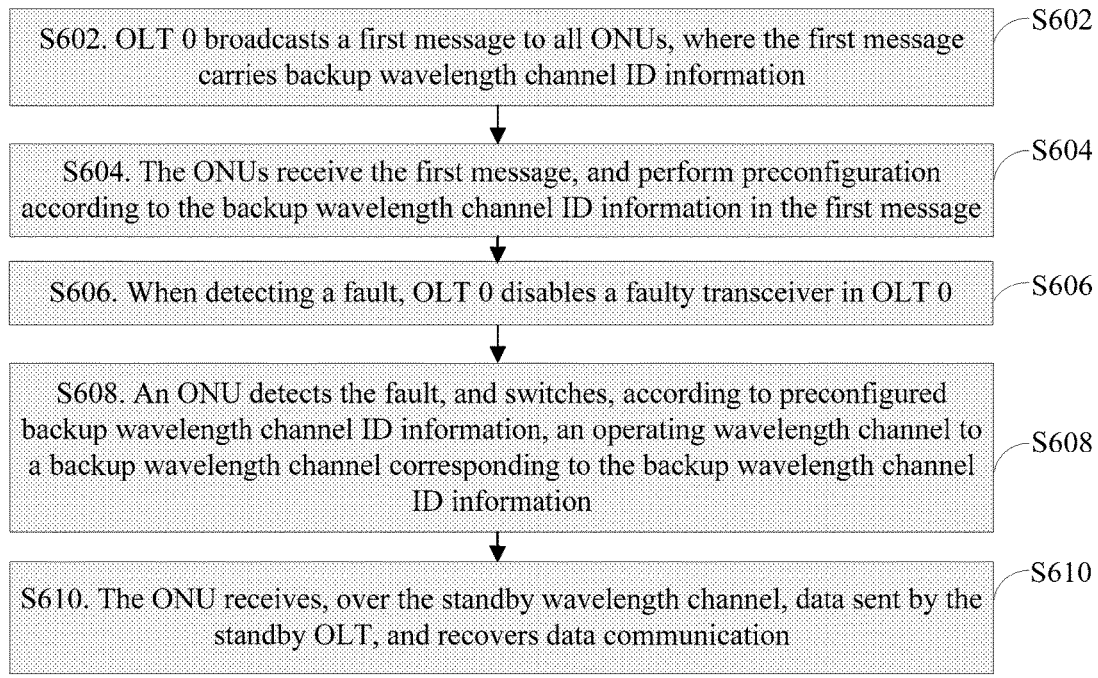
FIG. 6 is a schematic flowchart of another passive optical network communications method according to an embodiment of the present invention.

Based on the architecture in FIG. 5, the passive optical network communications method is described below, as shown in FIG. 6:

S602. OLT 0 broadcasts a first message to all ONUs, where the first message carries backup wavelength channel ID information.

Before step S602, OLT 0 itself presets a correspondence between operating wavelength channel ID information and backup wavelength channel ID information of transceivers of the ONUs, and delivers the correspondence to the ONUs, where the correspondence may be determined by mutual selection from existing operating wavelength channel ID information, that is, mutual backup is implemented. For example, the correspondence table may include: Work wavelength channel 3 and operating wavelength channel 2 used by ONU 3 are mutual backups. OLT 0 uses operating wavelength channel 2 as a backup wavelength channel of ONU 3, which is delivered by being carried in the first message. According to the preconfigured correspondence, OLT 0 delivers the backup channel ID information and the like to the ONUs in the format of the first message, so that all the ONUs perform the corresponding preconfiguration.

Further, a PLOAM message is used as an example of the first message to carry the backup wavelength channel ID information. Table 5 shows a specific PLOAM message format that carries the backup wavelength channel ID information:

TABLE 5

| Octet | Content | Description |
|---|---|---|
| 1-2 | ONU-ID | Broadcast message to all ONUs of one downstream wavelength. As a broadcast to all ONUs, ONU-ID = 0x03FF. |
| 3 | Message type ID | Protect-pair-configure |
| 4 | SeqNo | Broadcast or Unicast PLOAM sequence number. |
| 5 | 0000 000C | Protect-pair-quantity |
| 6 | Work wavelength channel ID information | DDDD: ID of a downstream operating wavelength channel (ID of work downstream wavelength channel) UUUU: ID of an upstream operating wavelength channel (ID of work upstream wavelength channel) |

TABLE 5-continued

| Octet | Content | Description |
|---|---|---|
| 7 | Backup wavelength channel ID information | AAAA: ID of downstream backup wavelength channel (ID of downstream backup wavelength channel) BBBB: ID of upstream backup wavelength channel (ID of upstream backup wavelength channel) |
| ... | | |
| n-40 | Padding | Set to 0x00 by the transmitter; treated as "don't care" by the receiver. |
| 41-48 | MIC | Message integrity check. |

In Table 5, octets 1-2 in the PLOAM message are an ONU ID field, and are generally padded with 0X03FF for a broadcast message, which is not limited thereto. Octet 3 is a message type field and is protect-pair-configure (protect-pair-configure), and this octet is a new field. Octet 4 is a sequence number of a broadcast or unicast PLOAM message. Octet 5 is 0000 000C, and is used to identify a protect-pair-quantity. The protect-pair-quantity is primarily used to identify a quantity of operating wavelength channels identified by operating wavelength channel IDs and backup wavelength channels identified by backup wavelength channel IDs in octets 6-n. Octet 6 in Table 5 is operating wavelength channel ID (operating wavelength channel ID) information, which may specifically include: ID of a downstream wavelength channel (ID of downstream wavelength channel), used to identify an operating wavelength channel used by the ONU in a downstream direction, where the operating wavelength channel may be specifically identified in a DDDD manner; and ID of an upstream wavelength channel (ID of upstream wavelength channel), used to identify an operating wavelength channel used by the ONU in an upstream direction, where the operating wavelength channel may be specifically identified in a UUUU manner. Octet 7 is backup wavelength channel ID (Backup wavelength channel ID) information, which may specifically include: ID of a downstream backup wavelength channel (ID of downstream backup wavelength channel), used to identify a downstream backup wavelength channel used by the ONU, where the downstream backup wavelength channel may be specifically identified in an AAAA manner; and ID of an upstream backup wavelength channel (ID of upstream backup wavelength channel), used to identify an upstream backup wavelength channel used by the ONU, where the upstream backup wavelength channel may be specifically identified in a BBBB manner. Octets n-40 may be padded with 0X00. Octets 41-48 are used for message integrity check. Octet 3 and octets 5-7 are new fields.

It should be understood that, in this embodiment of the present invention, an order and positions of the content of the octets in Table 5 are changeable. For example, octets 1-2 represent backup wavelength channel ID (Backup wavelength channel ID) information, octet 5 is used to represent an ONU ID, which may change randomly without being limited to the foregoing form so long as at least one or more octets in the PLOAM message represents backup wavelength channel ID (Backup wavelength channel ID) information. In addition, in all the foregoing PLOAM message formats, except that the backup wavelength channel ID is a mandatory field of the message format, all other fields are optional.

The protect-pair-quantity field here is used to identify a quantity of wavelength protection pairs. The wavelength protection pair includes the operating wavelength channel identified by the operating wavelength channel ID and the backup wavelength channel identified by the backup wavelength channel ID, where the operating wavelength channel specifically includes the upstream operating wavelength channel identified by the upstream operating wavelength channel ID and the downstream operating wavelength channel identified by the downstream operating wavelength channel ID. The backup wavelength channel includes the upstream backup wavelength channel identified by the upstream backup wavelength channel ID and the downstream backup wavelength channel identified by the downstream backup wavelength channel ID. It should be understood that in Embodiment 2, the PLOAM message includes operating wavelength channel ID information and backup wavelength channel ID information. After detecting a fault, the ONU needs to perform wavelength channel switching according to the backup wavelength channel ID information, and the wavelength channel switching requires matching to corresponding backup wavelength channel ID information according to the operating wavelength channel ID information, so that the wavelength channel switching can be performed with the backup wavelength channel corresponding to the backup wavelength channel ID information.

S604. The ONUs receive the first message, and perform preconfiguration according to the backup wavelength channel ID information in the first message.

Specifically, in the networking architecture diagram in FIG. 5, after receiving the first message, the ONUs preconfigure the backup wavelength channel ID information in the first message. In the architecture shown in FIG. 5, the first message carries information such as the backup wavelength channel ID information of the ONUs. The ONUs each match corresponding backup wavelength channel ID information according to the operating wavelength channel ID information of themselves, and perform preconfiguration so that once a fault is detected, the ONUs switch to the backup wavelength channels corresponding to the preconfigured backup wavelength channel ID information.

S606. When detecting a fault, OLT 0 disables a faulty transceiver in OLT 0.

Specifically, OLT 0 detects the fault, and disables the faulty transceiver so that the ONUs are unable to receive data and further detect the fault.

S608. an ONU detects the fault, and switches, according to preconfigured backup wavelength channel ID information, an operating wavelength channel to a backup wavelength channel corresponding to the backup wavelength channel ID information.

Specifically, based on the architecture in FIG. 5, for example, when a port of transceiver 3 of OLT 0 is faulty, the port of transceiver 3 is disabled. Correspondingly, because ONU 3 is unable to receive downstream data, a fault occurs. According to the preconfigured backup wavelength channel ID information, ONU 3 finds the backup wavelength channel ID information of ONU 3 according to the operating wavelength channel ID information of ONU 3, and further switches the operating wavelength channel of ONU 3 to the backup wavelength channel corresponding to the backup wavelength channel ID information. Based on the downstream backup wavelength channel of the switched-to backup wavelength channel, ONU 3 receives data sent by the OLT, and over the upstream backup wavelength channel of the switched-to backup wavelength channel, ONU 3 sends data to the OLT.

S610. The ONU receives, over the standby wavelength channel, data sent by the standby OLT, and recovers data communication.

Using ONU 3 in step S608 as an example, based on the downstream backup wavelength channel of the switched-to backup wavelength channel, ONU 3 receives data sent by the OLT, and over the upstream backup wavelength channel of the switched-to backup wavelength channel, ONU 3 sends data to the OLT.

In this embodiment of the present invention, an ONU performs preconfiguration according to backup wavelength channel ID information sent by an OLT. When the ONU detects a fault, according to preconfigured backup wavelength channel information, the ONU quickly switches its own operating wavelength channel to a backup wavelength channel corresponding to the backup wavelength channel information so as to perform data communication over the switched-to backup wavelength channel, thereby implementing fast protection switching of a passive optical network system and improving reliability of the system.

Embodiment 3

Figure 7:
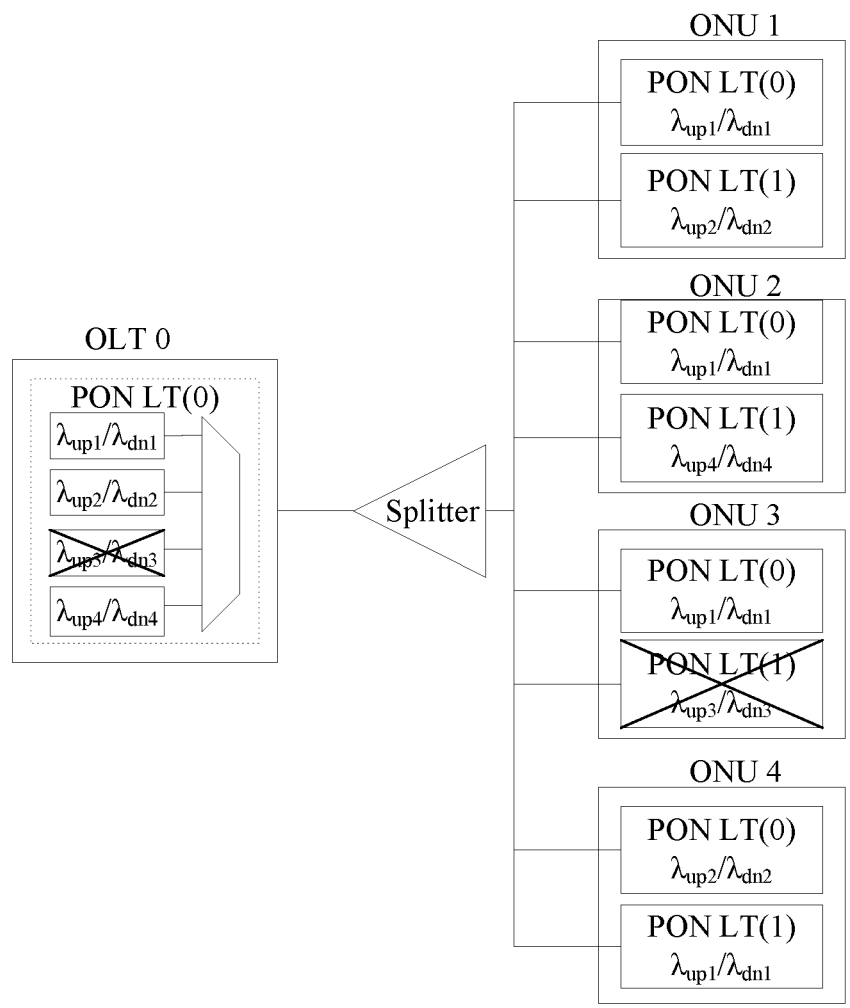
FIG. 7 is still another compositional architecture diagram of active/standby switching according to an embodiment of the present invention.

As shown in FIG. 7, FIG. 7 is another compositional architecture diagram of active/standby switching. For the structure of OLT 0 in FIG. 7, reference may be made to the structure of the active OLT, that is, OLT 0, in FIG. 3.

The structure of an ONU in FIG. 7 is different from the structure of an ONU in FIG. 3. Each ONU supports two transceivers. If the two transceivers use different transmit and receive wavelengths, each ONU can work on two different wavelength channels simultaneously. In this way, OLT 0 can adjust traffic volumes on the two different wavelength channels of the ONU flexibly according to load conditions of the wavelength channels, thereby achieving a purpose of load balance.

Any one ONU includes at least 2 transceivers. The transceivers work on two different operating wavelength channels. For example, ONU 1 includes transceiver 1 and transceiver 2; transceiver 1 works on operating wavelength channel 1, where operating wavelength channel 1 uses an upstream operating wavelength $\lambda up1$ and a downstream operating wavelength $\lambda dn1$; and transceiver 2 works on operating wavelength channel 2, where operating wavelength channel 2 uses an upstream operating wavelength $\lambda up2$ and a downstream operating wavelength $\lambda dn2$. The operating wavelength channel is identified by an operating wavelength channel ID. For example, an operating wavelength channel ID 1 identifies operating wavelength channel 1.

The operating wavelength channel information of one of the transceivers of the ONU here is configured according to the backup wavelength channel ID information carried in a first message delivered by OLT 0.

Figure 8:
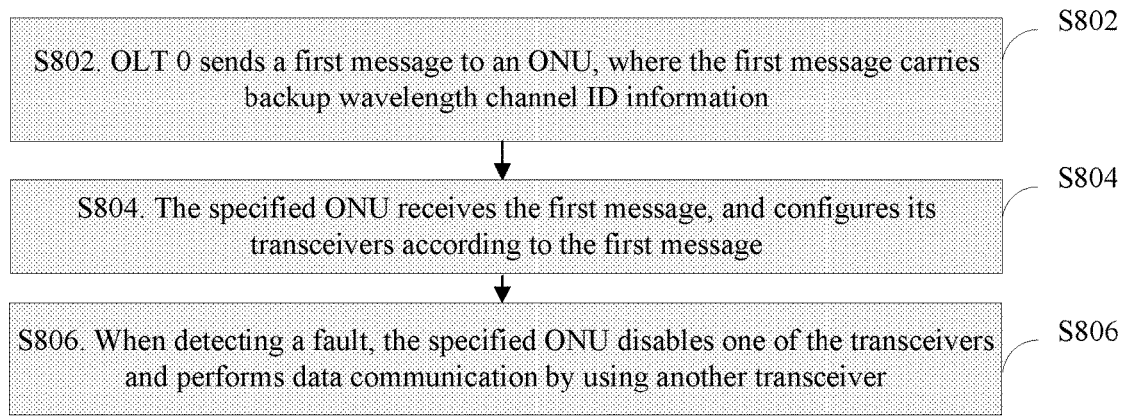
FIG. 8 is a schematic flowchart of still another passive optical network communications method according to an embodiment of the present invention.

The following describes a processing process of an ONU in detail. FIG. 8 is a schematic flowchart of still another passive optical network communications method according to an embodiment of the present invention:

S802. OLT 0 sends a first message to an ONU, where the first message carries backup wavelength channel ID information.

It should be understood that OLT 0 here delivers the message to a specified ONU in a unicast manner. That is, the first message delivered by the OLT includes ONU ID information of the specified ONU, indicating that the first message is to be sent to the ONU corresponding to the ONU ID.

S804. The specified ONU receives the first message, and configures its transceivers according to the first message.

Specifically, the ONU has at least two transceivers. During the configuration, the operating wavelength channel of another transceiver of the ONU is configured according to the backup wavelength channel ID information carried in the first message delivered by OLT 0. For example, at least two transceivers are configured for ONU 3: transceiver 1 and transceiver 3. In normal communication, ONU 3 performs data communication with transceiver 3 of OLT 0 by using transceiver 3. ONU 3 uses transceiver 3 to receive the first message delivered by the OLT. ONU 3 uses the backup wavelength channel, which is included in the backup wavelength channel ID information in the first message, as an operating wavelength channel of another transceiver 1. That is, the upstream operating wavelength of transceiver 1 of ONU 3 is set to the wavelength λup1 used by the upstream backup wavelength channel corresponding to the upstream backup wavelength channel ID, and the downstream operating wavelength of transceiver 1 is set to the wavelength λdn1 used by the downstream backup wavelength channel corresponding to the downstream backup wavelength channel ID.

In normal communication, both transceivers of the ONU can receive data sent by OLT 0.

Here, because the two transceivers of each ONU use different wavelength channel information, the OLT delivers the first message to the specified ONU in a unicast manner, where the first message carries different information. Specifically, a PLOAM message is used as an example of the first message received by a specified ONU. For a format of the message, refer to Table 6.

TABLE 6

| Octet | Content | Description |
|---|---|---|
| 1-2 | ONU-ID | Unicast ONU-ID for sending to a specified ONU |
| 3 | Message type ID | Protect-pair-configure (protect-pair-configure) |
| 4 | SeqNo | Broadcast or Unicast PLOAM sequence number. |
| 5 | 0000 000C | Protect-pair-quantity |
| 6 | Work wavelength channel ID information | DDDD: ID of a downstream operating wavelength channel (ID of work downstream wavelength channel) UUUU: ID of an upstream operating wavelength channel (ID of work upstream wavelength channel) |
| 7 | Backup wavelength channel ID information | AAAA: ID of downstream back up wavelength channel (ID of downstream backup wavelength channel) BBBB: ID of upstream protection wavelength channel (ID of upstream backup wavelength channel) |
| ... | | |
| n-40 | Padding | Set to 0x00 by the transmitter; treated as "don't care" by the receiver. |
| Octet | Content | Description |

The ONU ID in octets 1-2 in Table 6 is ID information of an ONU specified to receive the unicast message, because this is a unicast message, and is used to identify the specified ONU. Octet 3 is a message type ID, and its message content is protect-pair-configure. In an original PLOAM message, this message type ID is not defined. Therefore, this octet is a new message type. The protect-pair-quantity in octet 5 is also optional in this embodiment, and is used to identify a quantity of wavelength protection pairs. Content of octets 6-7 is the same as that in Table 5, and includes operating wavelength channel ID information and backup wavelength channel ID information. The operating wavelength channel ID information in octet 6 is optional in Embodiment 3. Because the PLOAM message delivered by the OLT here is delivered to a specified ONU, the message needs only to carry the backup wavelength channel ID information of the specified ONU. After receiving the message, the specified ONU performs wavelength channel preconfiguration for another transceiver of the ONU according to the backup wavelength channel ID information in the message. That is, the another transceiver of the ONU uses the backup wavelength channel corresponding to the backup wavelength channel ID information as an operating wavelength channel, and the another transceiver of the ONU is used for data communication when the ONU detects a fault. The octets n-40 are padding octets, and octets 41-48 are a message integrity check field.

S806. When the specified ONU detects a fault, the ONU disables one of the transceivers and performs data communication by using another transceiver.

Using ONU 3 as an example, when ONU 3 detects a fault, transceiver 3 of ONU 3 is disabled and data on a wavelength channel used by transceiver 3 is switched to transceiver 1 of ONU 3, and a wavelength channel used by transceiver 1 is used to receive and transmit data. Specifically, a downstream operating wavelength channel of transceiver 1 is used to receive data, and an upstream operating wavelength channel of transceiver 1 is used to transmit data.

In this embodiment of the present invention, an ONU performs preconfiguration according to backup wavelength channel ID information sent by an OLT. When the ONU detects a fault, data communication is performed over an operating wavelength channel of another transceiver, thereby implementing fast protection switching of a passive optical network system and improving reliability of the system.

Figure 9:
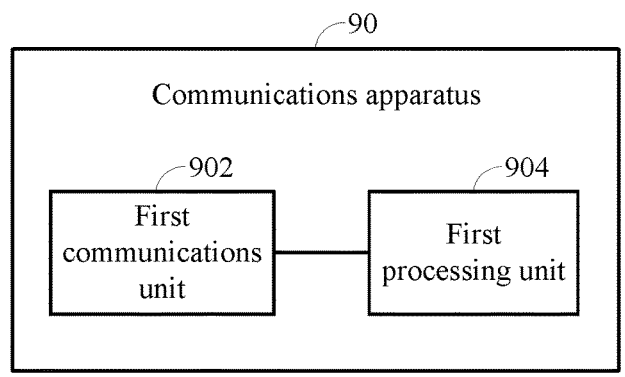
FIG. 9 is a schematic structural diagram of a communications apparatus according to the present invention.

An apparatus provided in an embodiment of the present invention is shown in FIG. 9.

A passive optical network communications apparatus 90 is provided, where the apparatus includes:

a first communications unit 902, configured to: receive a first message sent by an optical line terminal, where the first message carries backup wavelength channel ID information; and perform data communication over the switched-to backup wavelength channel; and a first processing unit 904, configured to: when an optical network unit detects a fault, switch, according to the first message received by the first communications unit, an operating wavelength channel of the optical network unit to a backup wavelength channel identified by the backup wavelength channel ID information.

The communications apparatus may be an ONU, and corresponds to the ONU in FIG. 1.

For specific functions of the ONU, refer to the specific description in the method embodiments in FIG. 1 to FIG. 8, and no repeated description is given herein.

The first communications unit may be a transceiver of the ONU. The first processing unit may be a MAC or a microprocessor, and the first processing unit may be implemented on a chip.

The first message includes a message type ID (Message type ID) field and a message content field, where the message type ID field of the first message is a channel profile field, a system profile field or a protect-pair-configure field, and the message content field includes the backup wavelength channel ID information.

The backup wavelength channel ID information includes a downstream backup wavelength channel ID.

The first processing unit is specifically configured to switch a downstream operating wavelength channel in operating wavelength channels of the optical network unit to a downstream backup wavelength channel identified by the downstream backup wavelength channel ID.

The backup wavelength channel ID information includes an upstream backup wavelength channel ID.

The first processing unit is specifically configured to switch an upstream operating wavelength channel in operating wavelength channels of the optical network unit to an upstream backup wavelength channel identified by the upstream backup wavelength channel ID.

The backup wavelength channel ID information includes a downstream backup wavelength channel ID and an upstream backup wavelength channel ID.

The first processing unit is specifically configured to: switch a downstream operating wavelength channel in operating wavelength channels of the optical network unit to a downstream backup wavelength channel identified by the downstream backup wavelength channel ID; and switch an upstream operating wavelength channel in the operating wavelength channels of the optical network unit to an upstream backup wavelength channel identified by the upstream backup wavelength channel ID.

The message content field further includes operating wavelength channel ID information, where the operating wavelength channel ID information corresponds to the backup wavelength channel ID information, and the operating wavelength channel ID information includes an operating wavelength channel ID.

The first processing unit is specifically configured to: according to its own operating wavelength channel, match an operating wavelength channel identified by the operating wavelength channel ID in the message content field; according to the matched operating wavelength channel, determine a backup wavelength channel identified by a backup wavelength channel ID; and switch the operating wavelength channel of the optical network unit to the backup wavelength channel.

The message content field further includes a protect-pair-quantity used to indicate a quantity of backup wavelength channel IDs carried in the message content field, where the backup wavelength channel IDs include the downstream backup wavelength channel ID and the upstream backup wavelength channel ID.

The first communications unit is further configured to receive a second message sent by the optical line terminal, where the second message includes a message type ID (Message type ID) field and a message content field, where the message type ID field of the second message is a channel profile ID field, a system profile field or a protect-pair-configure field, and the message content field includes an upstream backup wavelength channel ID.

The first processing unit is further configured to switch an upstream operating wavelength channel in the operating wavelength channels of the optical network unit to an upstream backup wavelength channel identified by the upstream backup wavelength channel ID in the second message.

Evidently, in this embodiment of the present invention, an ONU performs preconfiguration according to the backup wavelength channel ID information sent by the OLT. When the ONU detects a fault, according to preconfigured backup wavelength channel information, the ONU quickly switches its own operating wavelength channel to a backup wavelength channel corresponding to the backup wavelength channel information so as to perform data communication over the switched-to backup wavelength channel, thereby implementing fast protection switching of a passive optical network system and improving reliability of the system.

Figure 10:
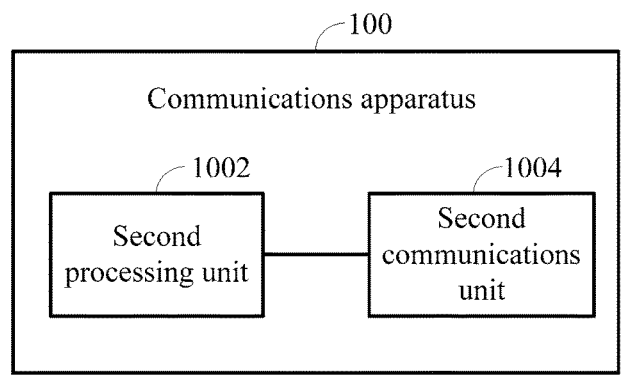
FIG. 10 is a schematic structural diagram of another communications apparatus according to the present invention.

As shown in FIG. 10, an embodiment of the present invention further provides a passive optical network communications apparatus 100, whose specific structure is described below:

The communications apparatus 100 includes:

a second processing unit 1002, configured to generate a first message, where the first message carries backup wavelength channel ID information, where the backup wavelength channel ID information is used to instruct to switch, when an optical network unit detects a fault, an operating wavelength channel of the optical network unit to a backup wavelength channel identified by the backup wavelength channel ID information; and a second communications unit 1004, configured to send the first message to the optical network unit.

The communications apparatus may be an OLT, and corresponds to the OLT in FIG. 1.

For specific functions of the ONUS, refer to the specific description in the method embodiments in FIG. 1 to FIG. 8, and no repeated description is given herein.

The second communications unit may be a transceiver of the OLT. The second processing unit may be a MAC or a microprocessor, and functions of the second processing unit may be implemented on a chip of the OLT.

Further, the first message includes a message type ID field and a message content field, where the message type ID field of the first message is a channel profile field, a system profile field or a protect-pair-configure field, and the message content field includes the backup wavelength channel ID information.

Further, the backup wavelength channel ID information includes a downstream backup wavelength channel ID, where the downstream backup wavelength channel ID is used to instruct to switch a downstream operating wavelength channel of the optical network unit to a downstream backup wavelength channel identified by the downstream backup wavelength channel ID.

Further, the backup wavelength channel ID information includes an upstream backup wavelength channel ID, where the upstream backup wavelength channel ID is used to instruct to switch an upstream operating wavelength channel of the optical network unit to an upstream backup wavelength channel identified by the upstream backup wavelength channel ID.

Further, the backup wavelength channel ID information includes a downstream backup wavelength channel ID and an upstream backup wavelength channel ID.

The downstream backup wavelength channel ID is used to instruct to switch a downstream operating wavelength channel of the optical network unit to a downstream backup wavelength channel identified by the downstream backup wavelength channel ID.

The upstream backup wavelength channel ID is used to instruct to switch an upstream operating wavelength channel of the optical network unit to an upstream backup wavelength channel identified by the upstream backup wavelength channel ID.

The message content field further includes operating wavelength channel ID information, where the operating wavelength channel ID information corresponds to the backup wavelength channel ID information, and the operating wavelength channel ID information includes an operating wavelength channel ID, where the operating wavelength channel ID is used to instruct the optical network unit to: match an operating wavelength channel identified by the operating wavelength channel ID; according to the matched operating wavelength channel, determine a backup wavelength channel identified by a backup wavelength channel ID; and switch the operating wavelength channel of the optical network unit to the backup wavelength channel.

Further, the message content field further includes a protect-pair-quantity used to indicate a quantity of backup wavelength channel IDs in the message content field, where the backup wavelength channel IDs include the downstream backup wavelength channel ID and the upstream backup wavelength channel ID.

Further, the second control unit is further configured to generate a second message, where the second message includes a message type ID (Message type ID) field and a message content field, where the message type ID field of the second message is a channel profile field, a system profile field or a protect-pair-configure field, and the message content field includes an upstream backup wavelength channel ID, where the upstream backup wavelength channel ID is used to instruct the optical network unit to switch an upstream operating wavelength channel in operating wavelength channels of the optical network unit to an upstream backup wavelength channel identified by the upstream backup wavelength channel ID in the second message.

The second communications unit is further configured to send the second message to an optical line terminal.

In this embodiment of the present invention, an OLT sends backup wavelength channel ID information to an ONU so that the ONU performs preconfiguration. When the ONU detects a fault, according to preconfigured backup wavelength channel information, the ONU quickly switches its own operating wavelength channel to a backup wavelength channel corresponding to the backup wavelength channel information so as to perform data communication over the switched-to backup wavelength channel, thereby implementing fast protection switching of a passive optical network system and improving reliability of the system.

Figure 11:
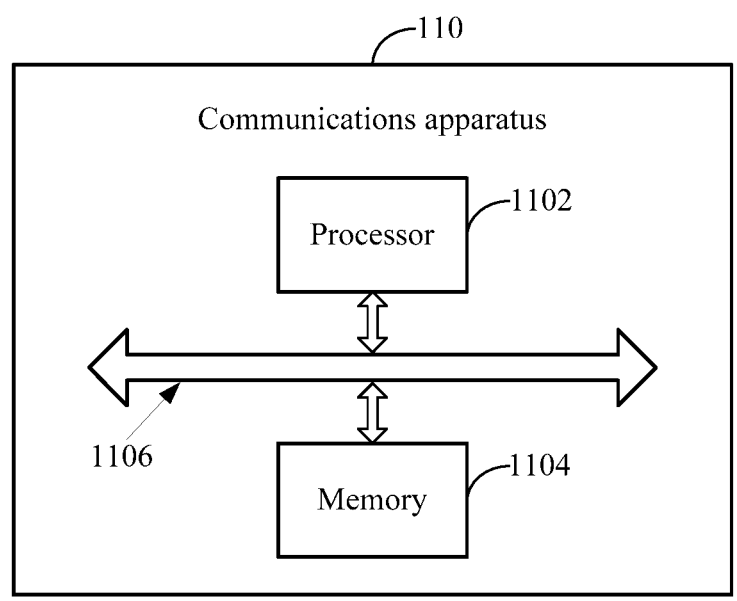
FIG. 11 is a schematic structural diagram of still another communications apparatus according to the present invention.

An embodiment of the present invention further provides a communications apparatus 110, as shown in FIG. 11.

The communications apparatus 110 includes a processor 1102, a memory 1104, and a bus system 1106, where the processor 1102 is connected to the memory 1104 by using the bus system 1106, the memory 1104 is configured to store an instruction, and the processor 1102 is configured to execute the instruction stored by the memory 1104. The processor 1102 is configured to generate a first message, where the first message carries backup wavelength channel ID information, where the backup wavelength channel ID information is used to instruct to switch, when an optical network unit detects a fault, an operating wavelength channel of the optical network unit to a backup wavelength channel identified by the backup wavelength channel ID information.

Further, for specific functions of the processor 1102, reference may be made to the specific functions of the second processing unit 1002 in the communications apparatus 100 in FIG. 10 of the apparatus embodiment, and no repeated description is given herein.

Therefore, the communications apparatus in this embodiment of the present invention is configured to generate a first message, where the first message carries backup wavelength channel ID information, where the backup wavelength channel ID information is used to instruct to switch, when an optical network unit detects a fault, an operating wavelength channel of the optical network unit to a backup wavelength channel identified by the backup wavelength channel ID information, thereby implementing fast protection switching of a passive optical network system and improving reliability of the system.

It should be understood that, in this embodiment of the present invention, the processor 1102 may be a central processing unit (Central Processing Unit, "CPU" for short), and the processor 1102 may also be another general purpose processor, a digital signal processor (DSP), an application-specific integrated circuit (ASIC), a field programmable gate array (FPGA) or other programmable logical device, a discrete gate or transistor logical device, a discrete hardware assembly, or the like. The general purpose processor may be a microprocessor, or the processor may also be any conventional processor or the like.

The memory 1104 may include a read-only memory and a random access memory, and provide instructions and data for the processor 1102. A part of the memory 1104 may further include a non-volatile random access memory. For example, the memory 1104 may further store device type information.

The bus system 1106 may include not only a data bus but also a power supply bus, a control bus, a status signal bus and the like. However, for clear description, various buses are denoted by the bus system 1106 in the diagram.

In an implementation process, steps of the foregoing methods may be implemented by using an integrated logical circuit in a hardware form or instructions in a software form in the processor 1102. Steps of the methods disclosed with reference to the embodiments of the present invention may be directly executed and accomplished by means of a hardware processor, or may be executed and accomplished by using a combination of hardware and software modules in the processor. The software module may be located in a mature storage medium in the field, such as a random access memory, a flash memory, a read-only memory, a programmable read-only memory, an electrically-erasable programmable memory or a register. The storage medium is located in the memory 1104, and the processor 1104 reads information in the memory 1104 and implements, in combination with its hardware, the steps of the foregoing methods. To avoid repetition, no detailed description is given herein again.

The present invention further provides a passive optical network system. Referring to FIG. 1, the passive optical network system at least includes an OLT and ONUs. The OLT is connected to the ONUs via an optical splitter (splitter). For functions implemented by the OLT, refer to FIG. 9 of the apparatus embodiments and corresponding description of FIG. 9; and for functions implemented by the ONUs, refer to FIG. 10 of the apparatus embodiments and corresponding description of FIG. 10. Specifically:

The OLT is configured to generate a first message, where the first message carries backup wavelength channel ID information, where the backup wavelength channel ID information is used to instruct to switch, when an optical network unit detects a fault, an operating wavelength channel of the optical network unit to a backup wavelength channel identified by the backup wavelength channel ID information; and send the first message to the optical network unit.

The ONU is configured to: receive a first message sent by an optical line terminal, where the first message carries backup wavelength channel ID information;

switch, by the optical network unit when the optical network unit detects a fault, an operating wavelength channel of the optical network unit to a backup wavelength channel identified by the backup wavelength channel ID information; and perform, by the optical network unit, data communication over the switched-to backup wavelength channel.

For specific formats of the first message and the second message, refer to the specific description in the corresponding embodiments in FIG. 2 to FIG. 8 in the method embodiments, and no repeated description is given herein.

In the passive optical network system provided in this embodiment of the present invention, an optical network unit receives a first message sent by an optical line terminal, where the first message carries backup wavelength channel ID information; when the optical network unit detects a fault, the optical network unit switches an operating wavelength channel of the optical network unit to a backup wavelength channel identified by the backup wavelength channel ID information; and the optical network unit performs data communication over the switched-to backup wavelength channel, thereby implementing fast protection switching of a passive optical network system and improving reliability of the system.

The present invention further provides a passive optical network system. Referring to FIG. 1, the passive optical network system at least includes an OLT and ONUs. The OLT is connected to the ONUs via an optical splitter (splitter). For functions implemented by the OLT, refer to FIG. 11 of the apparatus embodiments and corresponding description of FIG. 11; and for functions implemented by the ONU, refer to FIG. 10 of the apparatus embodiments and corresponding description of FIG. 10. Specifically:

The OLT includes a processor, a memory, and a bus system, where the processor is connected to the memory by using the bus system, the memory is configured to store an instruction, and the processor is configured to execute the instruction stored by the memory.

The processor is configured to generate a first message, where the first message carries backup wavelength channel ID information, where the backup wavelength channel ID information is used to instruct to switch, when an optical network unit detects a fault, an operating wavelength channel of the optical network unit to a backup wavelength channel identified by the backup wavelength channel ID information.

The ONU is configured to: receive a first message sent by an optical line terminal, where the first message carries backup wavelength channel ID information;

switch, by the optical network unit when the optical network unit detects a fault, an operating wavelength channel of the optical network unit to a backup wavelength channel identified by the backup wavelength channel ID information; and perform, by the optical network unit, data communication over the switched-to backup wavelength channel.

In this embodiment of the present invention, an ONU performs preconfiguration according to backup wavelength channel ID information sent by an OLT. When the ONU detects a fault, according to preconfigured backup wavelength channel information, the ONU quickly switches its own operating wavelength channel to a backup wavelength channel corresponding to the backup wavelength channel information so as to perform data communication over the switched-to backup wavelength channel, thereby implementing fast protection switching of a passive optical network system and improving reliability of the system.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also understand that all the embodiments described in this specification belong to exemplary embodiments, and the involved actions and modules are not necessarily mandatory to the present invention.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments of the present invention. The foregoing storage medium may include: any medium that can store program code, such as a USB flash drive, a removable hard disk, a magnetic disk, an optical disc, a read-only memory (ROM, Read-Only Memory), or a random access memory (RAM, Random Access Memory).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A passive optical network communications method comprising:
receiving, by an optical network unit, a first message sent by an optical line terminal, wherein the first message carries backup wavelength channel ID information;
switching, by the optical network unit when the optical network unit detects a fault, an operating wavelength channel of the optical network unit to a backup wavelength channel identified by the backup wavelength channel ID information; and
performing, by the optical network unit, data communication over the backup wavelength channel.

2. The communications method according to claim 1, wherein the first message comprises a message type ID field and a message content field, wherein the message type ID field of the first message is a channel profile field, a system profile field or a protect-pair-configure field, and the message content field comprises the backup wavelength channel ID information.

3. The communications method according to claim 1, wherein the backup wavelength channel ID information comprises a downstream backup wavelength channel ID; and
the switching, by the optical network unit, the operating wavelength channel of the optical network unit to the backup wavelength channel identified by the backup wavelength channel ID information comprises:
switching, by the optical network unit, a downstream operating wavelength channel in operating wavelength channels of the optical network unit to a downstream backup wavelength channel identified by the downstream backup wavelength channel ID.

4. The communications method according to claim 3, further comprising:
receiving a second message sent by the optical line terminal, wherein the second message comprises a message type ID field and a message content field, wherein the message type ID field of the second message is a channel profile ID field, a system profile field or a protect-pair-configure field, and the message content field comprises an upstream backup wavelength ID;
wherein the switching, by the optical network unit, the operating wavelength channel of the optical network unit to the backup wavelength channel identified by the backup wavelength channel ID information comprises:
switching, by the optical network unit, an upstream operating wavelength channel in the operating wavelength channels of the optical network unit to an upstream backup wavelength channel identified by the upstream backup wavelength channel ID in the second message.

5. The communications method according to claim 1, wherein the backup wavelength channel ID information comprises an upstream backup wavelength channel ID; and
the switching, by the optical network unit, the operating wavelength channel of the optical network unit to the backup wavelength channel identified by the backup wavelength channel ID information comprises:
switching, by the optical network unit, an upstream operating wavelength channel in operating wavelength channels of the optical network unit to an upstream backup wavelength channel identified by the upstream backup wavelength channel ID.

6. The communications method according to claim 1, wherein the backup wavelength channel ID information comprises a downstream backup wavelength channel ID and an upstream backup wavelength channel ID; and
the switching, by the optical network unit, the operating wavelength channel of the optical network unit to the backup wavelength channel identified by the backup wavelength channel ID information comprises:
switching, by the optical network unit, a downstream operating wavelength channel in operating wavelength channels of the optical network unit to a downstream backup wavelength channel identified by the downstream backup wavelength channel ID; and
switching, by the optical network unit, an upstream operating wavelength channel in the operating wavelength channels of the optical network unit to an upstream backup wavelength channel identified by the upstream backup wavelength channel ID.

7. The communications method according to claim 1, wherein:
the message content field further comprises operating wavelength channel ID information, wherein the operating wavelength channel ID information corresponds to the backup wavelength channel ID information, and the operating wavelength channel ID information comprises an operating wavelength channel ID; and
the switching, by the optical network unit, the operating wavelength channel of the optical network unit to the backup wavelength channel identified by the backup wavelength channel ID information comprises:
matching, by the optical network unit according to its own operating wavelength channel, an operating wavelength channel identified by the operating wavelength channel ID in the message content field;
determining, by the optical network unit according to the matched operating wavelength channel, the backup wavelength channel identified by the backup wavelength channel ID information; and
switching, by the optical network unit, the operating wavelength channel of the optical network unit to the backup wavelength channel.

8. The communications method according to claim 1, wherein the message content field further comprises a protect-pair-quantity used to indicate a quantity of backup wavelength channel IDs carried in the message content field, wherein the backup wavelength channel IDs comprise the downstream backup wavelength channel ID and the upstream backup wavelength channel ID.

9. A passive optical network communications method comprising:
generating, by an optical line terminal, a first message, wherein the first message carries backup wavelength channel ID information, wherein the backup wavelength channel ID information is used for switching, when an optical network unit detects a fault, an operating wavelength channel of the optical network unit to a backup wavelength channel identified by the backup wavelength channel ID information; and
sending the first message to the optical network unit.

10. The communications method according to claim 9, wherein the first message comprises a message type ID field and a message content field, wherein the message type ID field of the first message is a channel profile field, a system profile field or a protect-pair-configure field, and the message content field comprises the backup wavelength channel ID information.

11. The communications method according to claim 9, wherein the backup wavelength channel ID information comprises a downstream backup wavelength channel ID, and the downstream backup wavelength channel ID is used for:
  switching a downstream operating wavelength channel of the optical network unit to a downstream backup wavelength channel identified by the downstream backup wavelength channel ID.

12. The communications method according to claim 9, wherein the backup wavelength channel ID information comprises an upstream backup wavelength channel ID, and the upstream backup wavelength channel ID is used for switching an upstream operating wavelength channel of the optical network unit to an upstream backup wavelength channel identified by the upstream backup wavelength channel ID.

13. The communications method according to claim 12, further comprising: sending a second message to the optical line terminal, wherein the second message comprises a message type ID Message type ID field and a message content field, wherein the message type ID field of the second message is a channel profile field, a system profile field or a protect-pair-configure field, and the message content field comprises an upstream backup wavelength channel ID, wherein the upstream backup wavelength channel ID is used to instruct the optical network unit to switch an upstream operating wavelength channel in operating wavelength channels of the optical network unit to an upstream backup wavelength channel identified by the upstream backup wavelength channel ID in the second message.

14. The communications method according to claim 9, wherein:
  the backup wavelength channel ID information comprises a downstream backup wavelength channel ID and an upstream backup wavelength channel ID;
  the downstream backup wavelength channel ID is used for switching a downstream operating wavelength channel of the optical network unit to a downstream backup wavelength channel identified by the downstream backup wavelength channel ID; and
  the upstream backup wavelength channel ID is used for switching an upstream operating wavelength channel of the optical network unit to an upstream backup wavelength channel identified by the upstream backup wavelength channel ID.

15. The communications method according to claim 9, wherein the message content field further comprises operating wavelength channel ID information, wherein the operating wavelength channel ID information corresponds to the backup wavelength channel ID information, and the operating wavelength channel ID information comprises an operating wavelength channel ID, wherein the operating wavelength channel ID is used to instruct the optical network unit to: match an operating wavelength channel identified by the operating wavelength channel ID; determine, according to the matched operating wavelength channel, a backup wavelength channel identified by a backup wavelength channel ID; and switch the operating wavelength channel of the optical network unit to the backup wavelength channel.

16. The communications method according to claim 9, wherein the message content field further comprises a protect-pair-quantity used to indicate a quantity of backup wavelength channel IDs in the message content field, wherein the backup wavelength channel IDs comprise the downstream backup wavelength channel ID and the upstream backup wavelength channel ID.

17. A passive optical network communications apparatus comprising:
  a transceiver configured to:
    receive a first message sent by an optical line terminal, wherein the first message carries backup wavelength channel ID information; and
    perform data communication over a switched-to backup wavelength channel; and
  a processor configured to:
    when an optical network unit detects a fault, switch, according to the first message received by the first communications unit, an operating wavelength channel of the optical network unit to a backup wavelength channel identified by the backup wavelength channel ID information.

18. The communications apparatus according to claim 17, wherein the first message comprises a message type ID field and a message content field, wherein the message type ID field of the first message is a channel profile field, a system profile field or a protect-pair-configure field, and the message content field comprises the backup wavelength channel ID information.

19. The communications apparatus according to claim 17, wherein:
  the backup wavelength channel ID information comprises a downstream backup wavelength channel ID; and
  the processor is configured to switch a downstream operating wavelength channel in operating wavelength channels of the optical network unit to a downstream backup wavelength channel identified by the downstream backup wavelength channel ID.

20. The communications apparatus according to claim 19, wherein:
  the transceiver is further configured to receive a second message sent by the optical line terminal, wherein the second message comprises a message type ID field and a message content field, wherein the message type ID field of the second message is a channel profile ID field, a system profile field or a protect-pair-configure field, and the message content field comprises an upstream backup wavelength channel ID; and
  the processor is further configured to switch an upstream operating wavelength channel in the operating wavelength channels of the optical network unit to an upstream backup wavelength channel identified by the upstream backup wavelength channel ID in the second message.

21. The communications apparatus according to claim 17, wherein:
  the backup wavelength channel ID information comprises an upstream backup wavelength channel ID; and
  the processor is configured to switch an upstream operating wavelength channel in operating wavelength channels of the optical network unit to an upstream backup wavelength channel identified by the upstream backup wavelength channel ID.

22. The communications apparatus according to claim 17, wherein:
  the backup wavelength channel ID information comprises a downstream backup wavelength channel ID and an upstream backup wavelength channel ID; and
  the processor is configured to: switch a downstream operating wavelength channel in operating wavelength channels of the optical network unit to a downstream backup wavelength channel identified by the downstream backup wavelength channel ID; and switch an upstream operating wavelength channel in the operating wavelength channels of the optical network unit to an upstream backup wavelength channel identified by the upstream backup wavelength channel ID.

23. The communications apparatus according to claim 17, wherein:
the message content field further comprises operating wavelength channel ID information, wherein the operating wavelength channel ID information corresponds to the backup wavelength channel ID information, and the operating wavelength channel ID information comprises an operating wavelength channel ID; and
the processor is configured to: according to its own operating wavelength channel, match an operating wavelength channel identified by the operating wavelength channel ID in the message content field; according to the matched operating wavelength channel, determine a backup wavelength channel identified by a backup wavelength channel ID; and switch the operating wavelength channel of the optical network unit to the backup wavelength channel.

24. The communications apparatus according to claim 17, wherein the message content field further comprises a protect-pair-quantity used to indicate a quantity of backup wavelength channel IDs carried in the message content field, wherein the backup wavelength channel IDs comprise the downstream backup wavelength channel ID and the upstream backup wavelength channel ID.

25. A passive optical network communications apparatus comprising:
a processor configured to generate a first message, wherein the first message carries backup wavelength channel ID information, wherein the backup wavelength channel ID information is used for switching, when an optical network unit detects a fault, an operating wavelength channel of the optical network unit to a backup wavelength channel identified by the backup wavelength channel ID information; and
a transceiver configured to send the first message to the optical network unit.

26. The communications apparatus according to claim 25, wherein the first message comprises a message type ID field and a message content field, wherein the message type ID field of the first message is a channel profile field, a system profile field or a protect-pair-configure field, and the message content field comprises the backup wavelength channel ID information.

27. The communications apparatus according to claim 25, wherein the backup wavelength channel ID information comprises a downstream backup wavelength channel ID, and
wherein the downstream backup wavelength channel ID is used to:
switch a downstream operating wavelength channel of the optical network unit to a downstream backup wavelength channel identified by the downstream backup wavelength channel ID.

28. The communications apparatus according to claim 27, wherein the second control unit is further configured to generate a second message, wherein the second message comprises a message type ID Message type ID field and a message content field, wherein the message type ID field of the second message is a channel profile field, a system profile field or a protect-pair-configure field, and the message content field comprises an upstream backup wavelength channel ID, wherein the upstream backup wavelength channel ID is used to instruct the optical network unit to switch an upstream operating wavelength channel in operating wavelength channels of the optical network unit to an upstream backup wavelength channel identified by the upstream backup wavelength channel ID in the second message; and
the second communications unit is further configured to send the second message to an optical line terminal.

29. The communications apparatus according to claim 25, wherein the backup wavelength channel ID information comprises an upstream backup wavelength channel ID, and the upstream backup wavelength channel ID is used to instruct to switch an upstream operating wavelength channel of the optical network unit to an upstream backup wavelength channel identified by the upstream backup wavelength channel ID.

30. The communications apparatus according to claim 25, wherein:
the backup wavelength channel ID information comprises a downstream backup wavelength channel ID and an upstream backup wavelength channel ID;
the downstream backup wavelength channel ID is used to instruct to switch a downstream operating wavelength channel of the optical network unit to a downstream backup wavelength channel identified by the downstream backup wavelength channel ID; and
the upstream backup wavelength channel ID is used to instruct to switch an upstream operating wavelength channel of the optical network unit to an upstream backup wavelength channel identified by the upstream backup wavelength channel ID.

31. The communications apparatus according to claim 25, wherein the message content field further comprises operating wavelength channel ID information, wherein the operating wavelength channel ID information corresponds to the backup wavelength channel ID information, and the operating wavelength channel ID information comprises an operating wavelength channel ID, wherein the operating wavelength channel ID is used to instruct the optical network unit to: match an operating wavelength channel identified by the operating wavelength channel ID; according to the matched operating wavelength channel, determine a backup wavelength channel identified by a backup wavelength channel ID; and switch the operating wavelength channel of the optical network unit to the backup wavelength channel.

32. The communications apparatus according to claim 25, wherein the message content field further comprises a protect-pair-quantity used to indicate a quantity of backup wavelength channel IDs in the message content field, wherein the backup wavelength channel IDs comprise the downstream backup wavelength channel ID and the upstream backup wavelength channel ID.

33. A communications apparatus, wherein the communications apparatus comprises a processor, a memory, and a bus system, wherein the processor is connected to the memory by the bus system, the memory is configured to store instructions, and when the processor executes the instructions stored by the memory,
the processor is configured to generate a first message, wherein the first message carries backup wavelength channel ID information, wherein the backup wavelength channel ID information is used to instruct to switch, when an optical network unit detects a fault, an operating wavelength channel of the optical network unit to a backup wavelength channel identified by the backup wavelength channel ID information.

34. A passive optical network system, wherein the system comprises a first communications apparatus and a second communications apparatus; wherein the first communication apparatus comprises:
- a first transceiver configured to: receive a first message sent by an optical line terminal, wherein the first message carries backup wavelength channel ID information; and perform data communication over a switched-to backup wavelength channel; and
- a first processor configured to: when an optical network unit detects a fault, switch, according to the first message received by the first communications unit, an operating wavelength channel of the optical network unit to a backup wavelength channel identified by the backup wavelength channel ID information;

wherein the second communication apparatus comprises:
- a second processor configured to generate a first message, wherein the first message carries backup wavelength channel ID information, wherein the backup wavelength channel ID information is used to instruct to switch, when an optical network unit detects a fault, an operating wavelength channel of the optical network unit to a backup wavelength channel identified by the backup wavelength channel ID information; and
- a second transceiver configured to send the first message to the optical network unit.

35. A passive optical network system, wherein the system comprises a first communications apparatus and a second communications apparatus; and wherein the first communications apparatus comprises:
- a first transceiver configured to: receive a first message sent by an optical line terminal, wherein the first message carries backup wavelength channel ID information; and perform data communication over a switched-to backup wavelength channel; and
- a first processor configured to: when an optical network unit detects a fault, switch, according to the first message received by the first communications unit, an operating wavelength channel of the optical network unit to a backup wavelength channel identified by the backup wavelength channel ID information;

wherein the second communication apparatus comprises:
- a processor, a memory, and a bus system, wherein the processor is connected to the memory by using the bus system, the memory is configured to store instructions, and when the processor executes the instructions stored by the memory,
- the processor is configured to generate a first message, wherein the first message carries backup wavelength channel ID information, wherein the backup wavelength channel ID information is used to instruct to switch, when an optical network unit detects a fault, an operating wavelength channel of the optical network unit to a backup wavelength channel identified by the backup wavelength channel ID information.

* * * * *